US008199501B2

(12) United States Patent
Sawai et al.

(10) Patent No.: US 8,199,501 B2
(45) Date of Patent: Jun. 12, 2012

(54) ELECTRONIC EQUIPMENT

(75) Inventors: Jun Sawai, Kanagawa (JP); Masatsugu Chiba, Kanagawa (JP); Munetoshi Miyahara, Kanagawa (JP); Toyokatsu Noguchi, Shizuoka (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 12/729,715

(22) Filed: Mar. 23, 2010

(65) Prior Publication Data
US 2010/0265658 A1    Oct. 21, 2010

(30) Foreign Application Priority Data

Apr. 17, 2009  (JP) ................................. 2009-101387

(51) Int. Cl.
*H05K 7/20* (2006.01)
(52) U.S. Cl. ............... 361/694; 361/679.47; 361/679.48; 361/679.49; 361/679.5; 361/679.51; 361/695; 454/184; 165/104.33; 165/104.34
(58) Field of Classification Search ....... 361/679.46–51, 361/690–697, 689, 715–727; 165/104.33, 165/80.3, 121–127, 185; 454/184; 312/106–108, 312/223.2, 223.3, 308, 310, 321, 351.2, 336; 174/15.1, 16.3, 252
See application file for complete search history.

(56) References Cited

U.S. PATENT DOCUMENTS

| | | | |
|---|---|---|---|
| 4,502,099 A * | 2/1985 | Manes et al. | 361/691 |
| 5,214,570 A * | 5/1993 | Shah et al. | 361/679.31 |
| 5,923,532 A * | 7/1999 | Nedved | 361/690 |
| 6,222,725 B1 * | 4/2001 | Jo | 361/679.23 |
| 6,466,448 B1 * | 10/2002 | Baik | 361/752 |
| 6,477,044 B2 * | 11/2002 | Foley et al. | 361/695 |
| 6,744,632 B2 * | 6/2004 | Wilson et al. | 361/695 |
| 6,771,499 B2 * | 8/2004 | Crippen et al. | 361/679.48 |
| 6,934,161 B2 * | 8/2005 | Kim et al. | 361/752 |
| 6,970,363 B2 * | 11/2005 | Bassett et al. | 361/801 |
| 7,123,478 B2 * | 10/2006 | Chen | 361/695 |
| 7,262,064 B2 * | 8/2007 | Ohba et al. | 438/3 |
| 7,310,241 B2 * | 12/2007 | Peng et al. | 361/801 |
| 7,474,528 B1 * | 1/2009 | Olesiewicz et al. | 361/695 |
| 7,542,289 B2 * | 6/2009 | Tsai et al. | 361/695 |
| 7,549,917 B2 * | 6/2009 | Henry et al. | 454/184 |
| 7,643,292 B1 * | 1/2010 | Chen | 361/695 |
| 7,830,659 B2 * | 11/2010 | Liu et al. | 361/690 |
| 7,876,559 B2 * | 1/2011 | Shabbir et al. | 361/695 |

FOREIGN PATENT DOCUMENTS
JP          10-62047          3/1998
* cited by examiner

*Primary Examiner* — Michail V Datskovskiy
(74) *Attorney, Agent, or Firm* — Oblon, Spivak, McClelland, Maier & Neustadt, L.L.P.

(57) ABSTRACT

An electronic equipment includes an air flow control unit that controls an air flow generated by an air blow. The electronic equipment includes an expanding unit that is disposed behind the air flow control unit, includes an additional electronic circuit for an electronic circuit mounted on a main board, which are cooling targets of the air blow, and expands a function of the electronic circuit of the main board. The expanding unit has a hollow structure casing and includes the additional electronic circuit in an inside of the hollow structure casing. The air flow control unit has an opening part to allow the air flow to pass through and a blocking part to block the air flow, and supplies most of the air flow into the inside of the hollow structure casing of the expanding unit by the opening part and the blocking part, the blocking part including a vent.

11 Claims, 17 Drawing Sheets

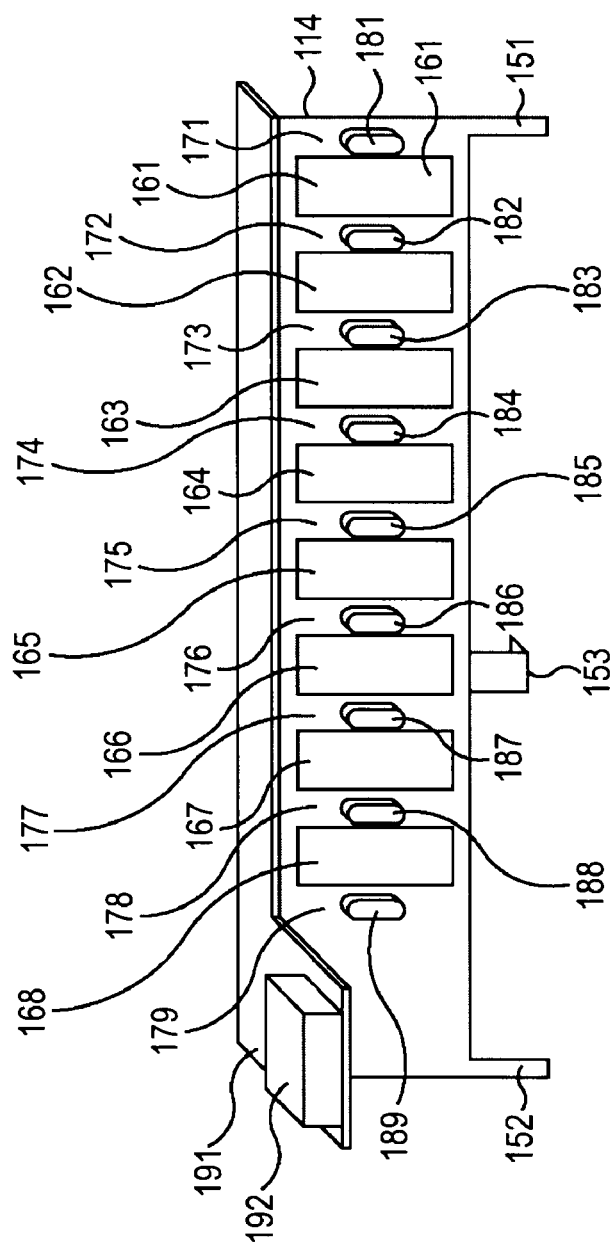
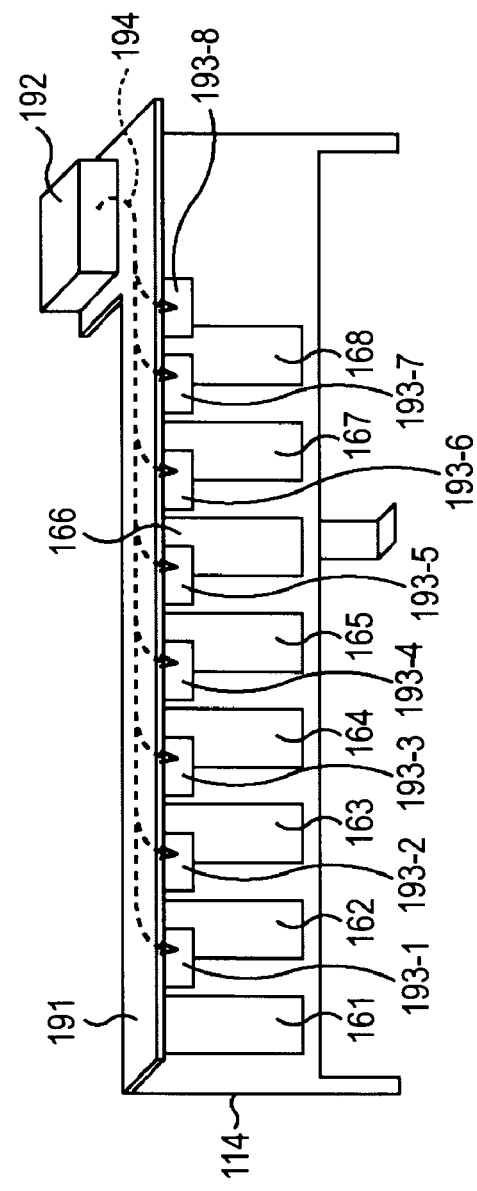
FIG.5A
FIG.5B

ELECTRONIC EQUIPMENT

BACKGROUND OF THE INVENTION

1. Field of the Invention

The present invention relates to an electronic equipment, and particularly to an electronic equipment in which a heat generating element in a casing can be efficiently cooled.

2. Description of the Related Art

Hitherto, in an electronic equipment or the like, various methods are proposed as a cooling method of an electronic component (heat generating element) which generates heat in the inside of a casing (for example, see JP-A-10-62047 (Patent Document 1). Especially, in an integrated circuit component such as an IC (Integrated Circuit) or an LSI (Large Scale Integration), as semiconductor technology advances in recent years, the integration degree is raised, and the heat generation density is remarkably increased. A more powerful cooling method is required for such an intense heat generating element.

For example, JP-A-10-62047 (Patent Document 1) discloses a method in which a ventilating hole is provided in a mother board, so that the occurrence of air accumulation in the inside of a casing is suppressed, and the cooling efficiency is improved.

SUMMARY OF THE INVENTION

However, in recent years, the processing power required for an electronic equipment is remarkably increased. In order to perform higher level processing at higher speed, for example, plural large CPUs are provided, or the number (capacity) of memories is increased, and the density of electronic components (heat generating elements) in the inside of a casing is increased. When the number of the heat generating elements is increased, not only the amount of heat generation is increased, but also the air accumulation is liable to occur due to the increase of the density. Accordingly, there is a fear the ventilation capacity is reduced.

The present invention is made in view of such circumstances, and it is desirable to enable a heat generating element in a casing to be more efficiently cooled by suitably controlling an air flow in the inside of the casing, which is generated by a ventilation function.

According to an embodiment of the present invention, there is provided an electronic equipment including air sending means for sending, at a front of an inside of a casing, air in a direction from a front surface of the casing to a back surface to cool a heat generating element, air flow control means that is disposed in the inside of the casing and behind the air sending means and is for controlling, by a shape, an air flow generated by air blow of the air sending means, and expanding means that is disposed in the inside of the casing and behind the air flow control means, includes an additional electronic circuit for an electronic circuit mounted on a main board, which are the electronic circuits as cooling targets of the air blow of the air sending means, and is for expanding a function of the electronic circuit of the main board, in which the expanding means has a hollow structure casing and includes the additional electronic circuit in an inside of the casing, the air flow control means has an opening part for allowing the air flow to pass through and a blocking part to block the air flow, and supplies most of the air flow into the inside of the casing of the expanding means by the opening part and the blocking part.

The air flow control means can fix the casing of the expanding means at a specified position to cause an opening part of the casing of the expanding means to correspond to the opening part of the air flow control means itself.

A plurality of the expanding means are provided, the air flow control means includes a plurality of the opening parts and a plurality of the blocking parts, and the respective casings of the expanding means can be fixed to specified positions different from each other to cause the opening parts of the respective casings of the plurality of the expanding means to correspond to the opening parts of the air flow control means itself different from each other.

The shape of the casing of the expanding means is a substantially rectangular parallelepiped shape of a hollow structure, and a front surface and a back surface of the casing can be opened.

A plurality of the expanding means are provided, and the substantially rectangular parallelepiped casings of the expanding means are arranged side by side in a lateral direction in the casing of the electronic equipment and can be installed.

At least two opposite surfaces of the substantially rectangular parallelepiped casing of the expanding means are formed of boards on which the additional electronic circuit can be mounted.

The expanding means can include a part of or all of the additional electronic circuit at an outside of the casing of the expanding means itself.

The air flow control means further can include an opening part to positively supply a part of the air flow to the outside of the casing of the expanding means.

The air flow control means further can include a cover member to cover the opening part of the air flow control means itself.

The cover member can be pressed and opened by the casing of the expanding means and is closed by a torsion coil spring.

According to the embodiment of the present invention, at the front of the inside of the casing, the air is sent in the direction from the front surface of the casing to the back surface for cooling the heat generating element, and at the rear of the inside of the casing, the air flow generated by air blow is controlled, and at the rear of the inside of the casing, the additional electronic circuit for the electronic circuit mounted on the main board is mounted, which are the electronic circuits as the cooling targets of the air blow, and the function of the electronic circuit of the main board is expanded. Besides, the casing of the hollow structure is provided, the additional electronic circuit is mounted in the inside of the casing, the opening part to allow the air flow to pass through and the blocking part to block the air flow are provided, and most of the air flow is supplied into the inside of the casing by the opening part and the blocking part.

According to the embodiment of the present invention, the heat generating element can be cooled. Particularly, the heat generating element installed in the casing can be more efficiently cooled.

BRIEF DESCRIPTION OF THE DRAWINGS

FIGS. 5A and 5B are perspective views showing a structural example of an air flow adjusting gate.

DETAILED DESCRIPTION OF THE INVENTION

Hereinafter, a mode (embodiment in the following) for carrying out the present invention will be described. Incidentally, the description will be made in the following order.
1. First embodiment (inner structure of an electronic equipment)
2. Second embodiment (structural application example of an air flow adjusting gate)

1. First Embodiment

[Structure of the Electronic Equipment]

Figure 1:
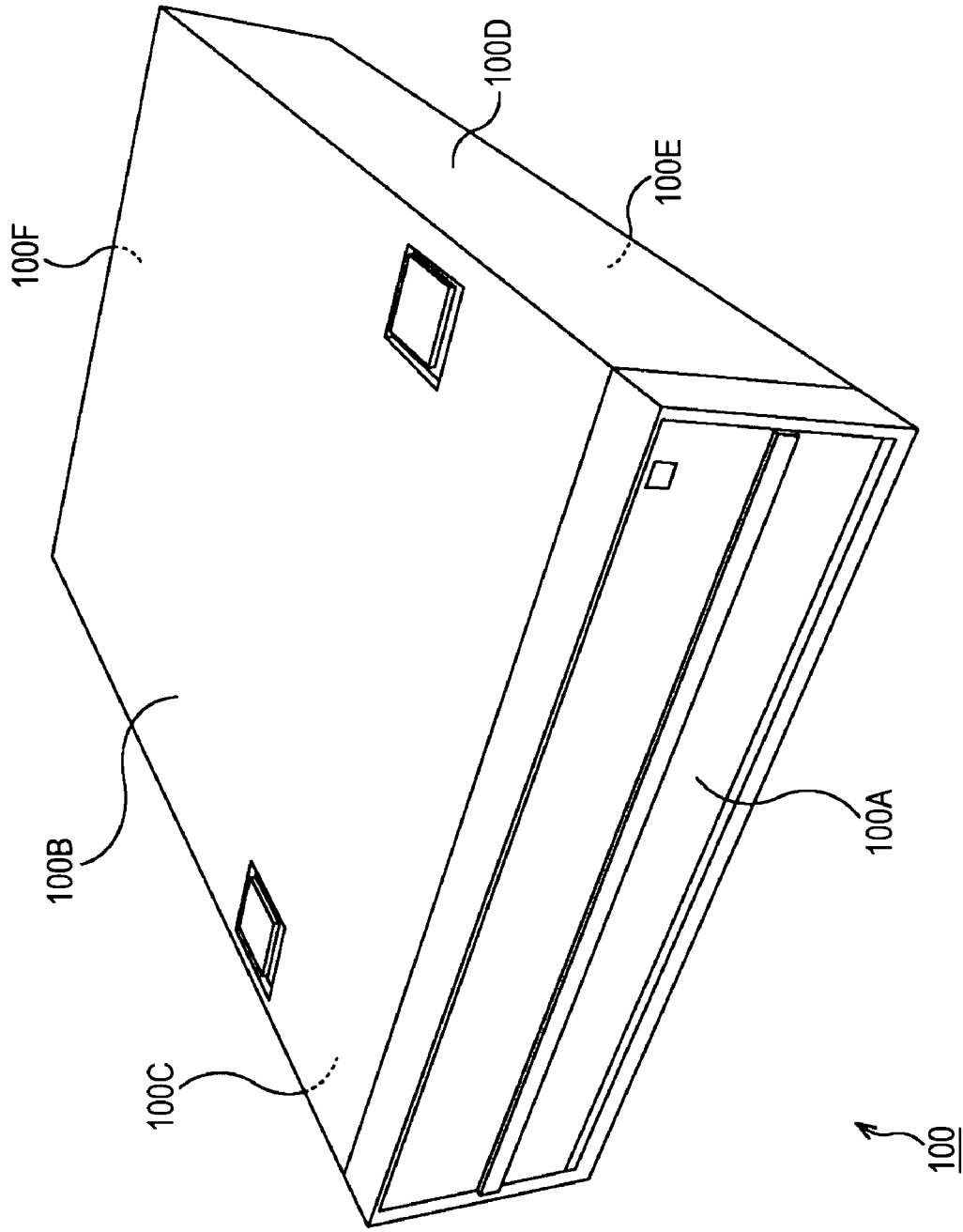
FIG. 1 is a perspective view showing the outer appearance of an information processing apparatus to which an embodiment of the invention is applied.

FIG. 1 is a perspective view showing the outer appearance of an information processing apparatus to which an embodiment of the invention is applied. The information processing apparatus 100 shown in FIG. 1 is an example of an electronic equipment including an electronic component (electronic circuit) which is a heat generating element as a cooling target. The information processing apparatus 100 is a high-performance electronic equipment to perform, at high speed, high-load information processing, such as coding processing to code image data of a base band and to generate a code stream, decoding processing to decode the code stream and to generate the image data of the base band, or image processing to perform various processes, such as picture quality adjustment and rate change, on the image data of the base band.

As shown in FIG. 1, a casing of the information processing apparatus 100 has a substantially rectangular parallelepiped shape in which an upper surface and a lower surface are wider than other surfaces. That is, the information processing apparatus includes the box-type casing having respective surfaces of a front surface 100A, an upper surface 100B, a left side surface 100C, a right side surface 100D, a bottom surface 100E and a back surface 100F, and includes an electronic circuit in the inside of the casing.

In general, the information processing apparatus 100, together with other information processing apparatuses, is arranged in a vertical direction or a horizontal direction, is installed on a rack or the like and is used. Accordingly, in order to more efficiently perform ventilation of the information processing apparatus 100, the ventilation is performed in the front-and-back direction in which the other apparatuses are not adjacent. At this time, in order to prevent exhaust from disturbing the user operation, in the information processing apparatus 100, air suction is performed from the front surface 100A and exhaust is performed from the back surface 100F (that is, ventilation is performed from the front direction to the back direction). Of course, the direction of the ventilation may be different from this direction, and may be an arbitrary direction.

Figure 2:
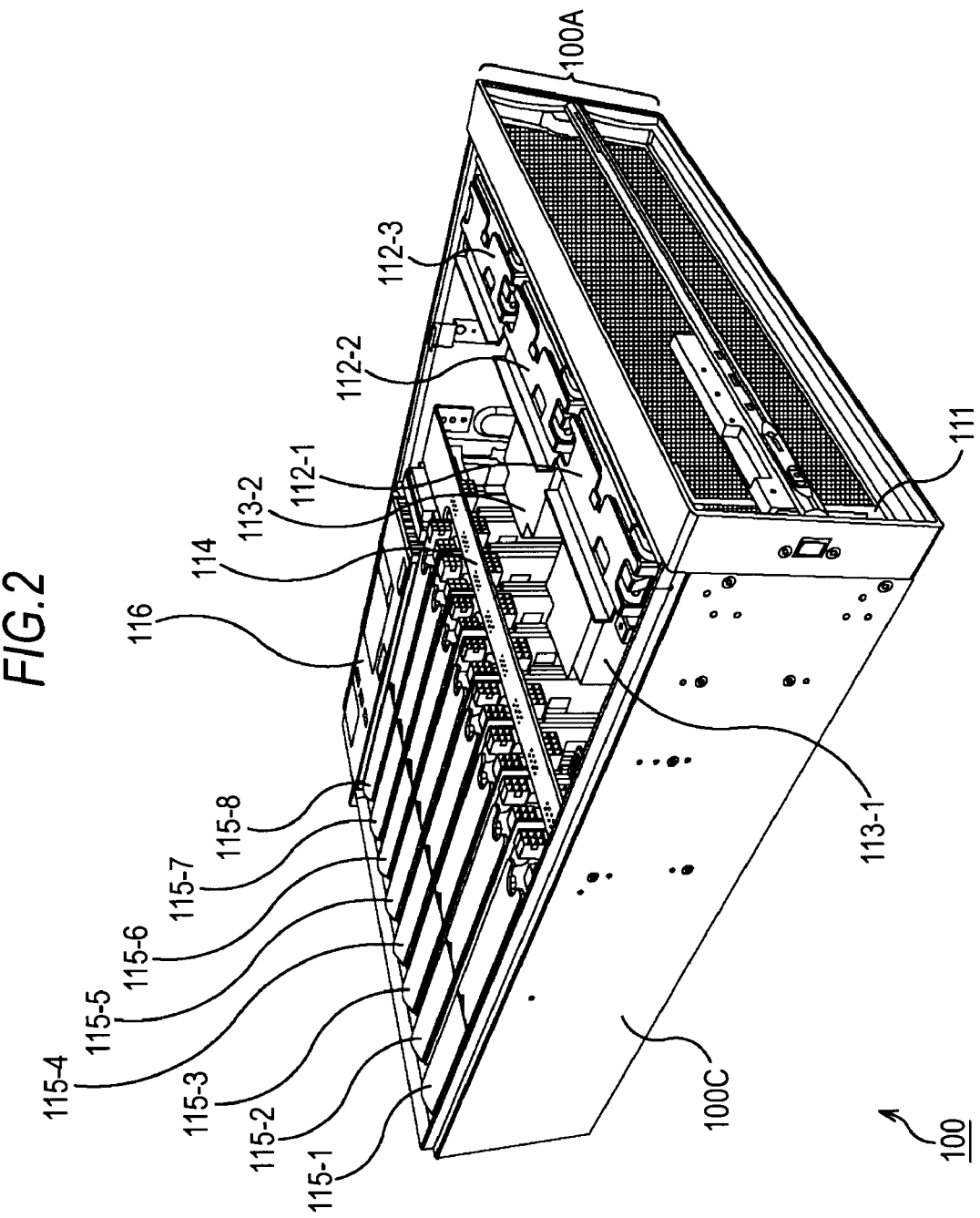
FIG. 2 is a perspective view showing a structural example of the inside of a casing of an electronic equipment of FIG. 1.

FIG. 2 is a perspective view showing a structural example of the inside of the casing of the information processing apparatus 100 of FIG. 1. In FIG. 2, a top plate (portion of the upper surface 100B of the casing) of the information processing apparatus 100 is removed.

A front plate 111 provided on the front surface 100A is a so-called front panel, is formed into a net (lattice) shape, causes the inside not to be easily seen from outside, and functions as an air suction hole to take in the air outside the casing. That is, in the information processing apparatus 100, air suction is performed from almost the whole front surface 100A.

Three blowers (fans), that is, a blower 112-1 to a blower 112-3 are provided at the back side of the front plate 111. Each of the blower 112-1 to the blower 112-3 rotates a blade to forcibly send the air from the front direction to the back direction. That is, the blower 112-1 to the blower 112-3 operate so that the air flows in the inside of the casing through the operating blower 112-1 to the blower 112-3 from the front direction to the back direction. That is, the air is sucked from the front plate 113 of the front surface 100A and is exhausted from the back surface 100F.

Incidentally, the blower 112-1 to the blower 112-3 are provided for almost the whole surface of the front surface 100A, and supply almost the whole air sucked through the front surface 100A to their own back sides. The blower 112-1 to the blower 112-3 are electrically connected to an aftermentioned power source unit 116, and are driven by the electric power supplied from the power source unit 116. Incidentally, the blower 112-1 to the blower 112-3 may also be electrically connected to an electronic circuit mounted on an after-mentioned main board 121, and the operation of the blower 112-1 to the blower 112-3 may be controlled by a control section (for example, a CPU etc.) of the electronic circuit.

In the following, when it is not necessary to distinguish between the blower 112-1 to the blower 112-3 when a description is made, each of them is simply called the blower 112.

A CPU (Central Processing Unit) heat sink 113-1 and a CPU heat sink 113-2 are provided in the vicinity of the back surface 100F side of the blowers 112. Although not shown in FIG. 2, the main board is provided at the back side and the lower side of the blower 112. Each of the CPU heat sink 113-1 and the CPU heat sink 113-2 is placed on a CPU (not shown) provided on the main board. When it is not necessary to distinguish between the CPU heat sink 113-1 and the CPU heat sink 113-2 when a description is made, each of them is simply called the CPU heat sink 113.

The CPU heat sink 113 is a so-called heat sink and is a member to cool the CPU. In order to more efficiently release the heat, the CPU heat sink 113 has a shape of large surface area, and for example, plural plate-like members are arranged in a comb shape. The heat generated by driving of a CPU is transmitted to the CPU heat sink 113 provided on the CPU and is released into the air. At this time, the blower 112 forcibly sends the air in the outside of the casing, which is sucked through the front plate 111, to the CPU heat sink 113, so that heat dissipation by the CPU heat sink 113 is accelerated. That is, the cooling efficiency of the CPU is improved.

An air flow adjusting gate 114 is provided behind the CPU heat sink 113 in the casing of the information processing apparatus 100. By the air blow of the blower 112, at the rear part of the blower 112 in the inside of the casing, an air flow is generated not only in the portion of the CPU heat sink 113 but also in almost the whole portion.

As described later, the main board is installed on substantially the whole of the rear part of the blower 112 in the inside of the casing. That is, the main board is formed over substantially the whole of the lower side of a portion between the blower 112 and the air flow adjusting gate 114. Many electronic components (that is, heat generating elements) such as an LSI and DRAM (Dynamic Random Access Memory) are provided on the portion of the main board, other than the portion of the CPU heat sink 113, between the blower 112 and the air adjusting gate 114. Those electronic components are also cooled (so-called air cooled) by the air blow of the blower 112 irrespective of the presence or absence of the heat sink. That is, these electronic components (including the heat sink) are cooling targets.

The air flow adjusting gate 114 is a member provided in the inside of the casing and behind the CPU heat sink 113. The air flow adjusting gate 114 is installed in the casing so that the main portion is positioned on the upper side of the main board. The air flow adjusting gate 114 is a member provided with a gate to allow passing of an air flow in the front-and-back direction generated in the inside of the casing by the air blow of the blower 112. The air flow adjusting gate 114 allows the air flow to pass through the gate, and adjusts and controls the path, air amount, air pressure and the like of the air flow. Besides, the air flow adjusting gate 114 supports an expansion unit 115-1 to an expansion unit 115-8, and assists the fixing of those to the casing. Further, the air flow adjusting gate 114 includes a power circuit and a power source terminal, and supplies electric power supplied from the power source unit 116 to the expansion unit 115-1 to the expansion unit 115-8 fixed to the air flow adjusting gate 114 itself.

Each of the expansion unit 115-1 to the expansion unit 115-8 is a member attachable to and detachable from the main board to expand the function of the information processing apparatus 100. A specified additional electronic circuit for the electronic circuit on the main board is mounted on each of the expansion unit 115-1 to the expansion unit 115-8. The additional electronic circuit (hardware) is electrically connected to the electronic circuit (hardware) mounted on the main board, so that the electronic circuit on the main board and the electronic circuits of the expansion unit 115-1 to the expansion unit 115-8 can operate in cooperation with each other. By this, the hardware spec is improved, or a new function is added. That is, the function of the electronic circuit on the main board is expanded.

The expansion unit 115-1 to the expansion unit 115-8 are fixed to the casing by the back plate 117 forming the back surface 100F and the air flow adjusting gate 114 in the state where the electronic circuits are electrically connected to the electronic circuit on the main board. Although the fixing method is arbitrary, the expansion unit 115-1 to the expansion unit 115-8 are fixed to the back plate 117 and the air flow adjusting gate 114 by, for example, screwing.

Besides, electric power is supplied to the expansion unit 115-1 to the expansion unit 115-8 by the electrically connected air flow adjusting gate 114.

Although the details will be described later, the expansion unit 115-1 to the expansion unit 115-8 are cooled by air flow passing through the air flow adjusting gate 114. The air flow passes though the inside of the expansion unit 115-1 to the expansion unit 115-8, and is exhausted to the outside of the casing from the back plate 117 as the back surface 100F.

The back plate 117 is provided with, for example, an opening part having a specified size or is formed into a lattice shape (net shape). That is, at least a part of the back plate 117 is opened. This is for exhausting the air in the inside of the casing to the outside of the casing. When the air flow flowing from the front side of the inside of the casing reaches the back plate 117, a part or the whole thereof is exhausted to the outside of the casing through the opening part (including a lattice or a net) provided in the back plate 117. Incidentally, the aperture ratio of the back plate 117 is arbitrary.

Incidentally, in the following, when it is not necessary to distinguish between the expansion unit 115-1 to the expansion unit 115-8 when a description is made, each of them is simply called the expansion unit 115.

The power source unit 116 to supply electric power to the respective parts of the information processing apparatus 100 is provided at the right side of the expansion unit 115 when seen from the front surface 100A side.

Figure 3:
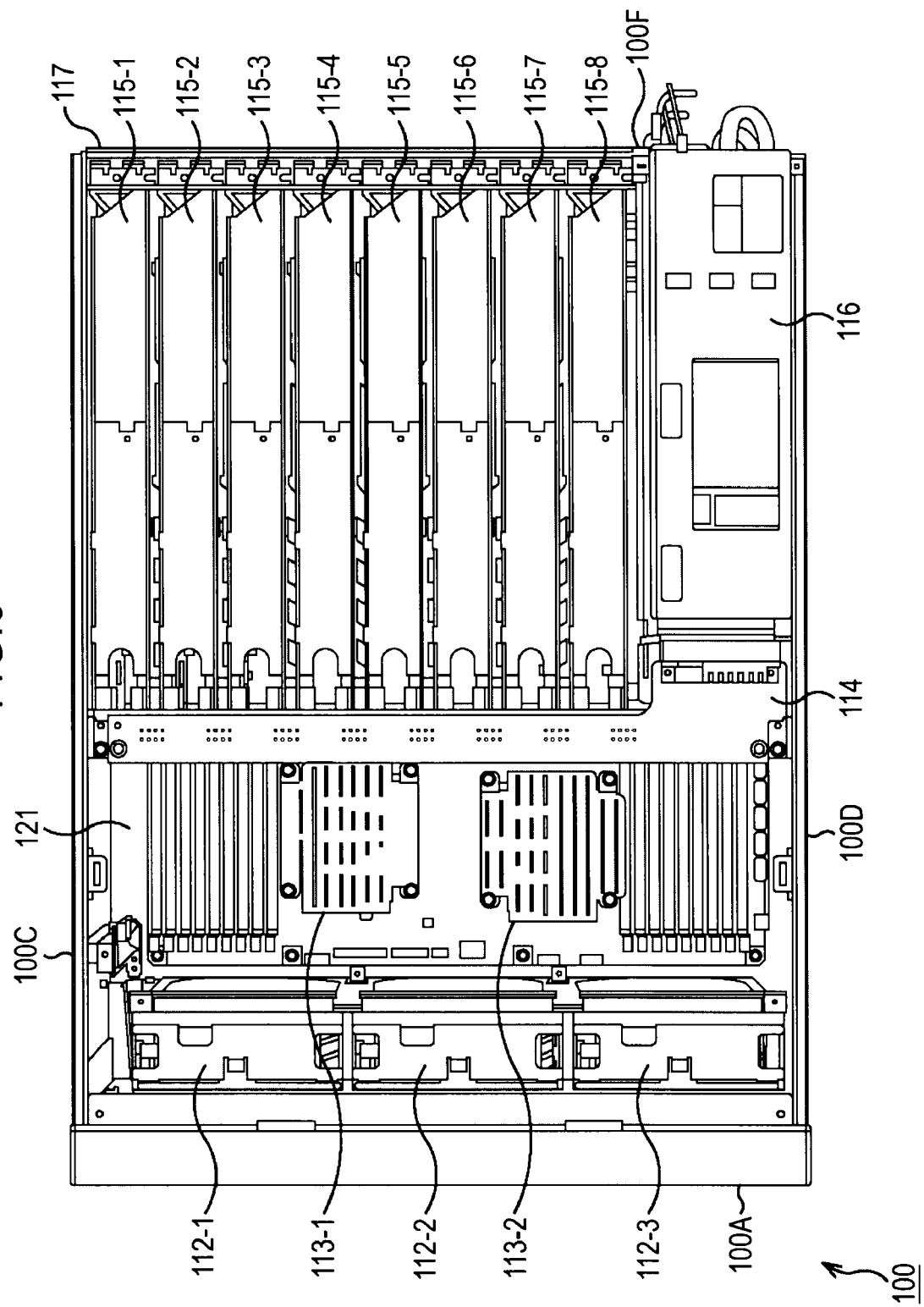
FIG. 3 is a top view in which the inside of the casing of the electronic equipment of FIG. 1 is seen from an upper surface side of the casing.

FIG. 3 is a top view in which the inside of the casing of the electronic equipment of FIG. 1 is seen from the upper surface side of the casing. As shown in FIG. 3, the main board 121 is overall arranged at the lower side of a portion behind the blower 112 in the inside of the casing of the information processing apparatus 100, and the air flow adjusting gate 114, the expansion units 115, the power source unit 116 and the like are installed on the upper side of the main board 121.

The air flow adjusting gate 114 is installed to extend in the right-and-left direction (substantially parallel to the front surface 100A and the back surface 100F). The respective expansion units 115 are installed between the air flow adjusting gate 114 and the back plate 117 forming the back surface 100F of the casing and are arranged side by side in the right-and-left direction so as to extend in the front-and-back direction (substantially parallel to the left side surface 100C and the right side surface 100D). That is, the expansion units 115 are installed at the side of the power source unit 116 and are arranged side by side.

A component, such as the CPU heat sink 113, which is too large to be disposed by overlapping the expansion unit 115 or the like is installed on the portion of the main board 121 in front of the air flow adjusting gate 114.

As shown in FIG. 3, in the inside of the casing of the information processing apparatus 100, the blower 112 is installed at the front surface side, the large component is installed behind it, and the air flow adjusting gate 114 is installed behind it. The expansion units 115 and the power source unit 116 are arranged side by side between the air flow adjusting gate 114 and the back plate 117 behind it. That is, as shown in FIG. 3, the arrangement structure of the respective components is very simplified, and the air is made to basically flow in one direction from the front to the back in substantially the whole inside of the casing. As stated above, by simplifying the movement of the air flow, the occurrence of air accumulation is suppressed, and the respective heat generating elements as the cooling targets installed in the casing can be more efficiently cooled.

[Structure of the Main Board]

Figure 4:
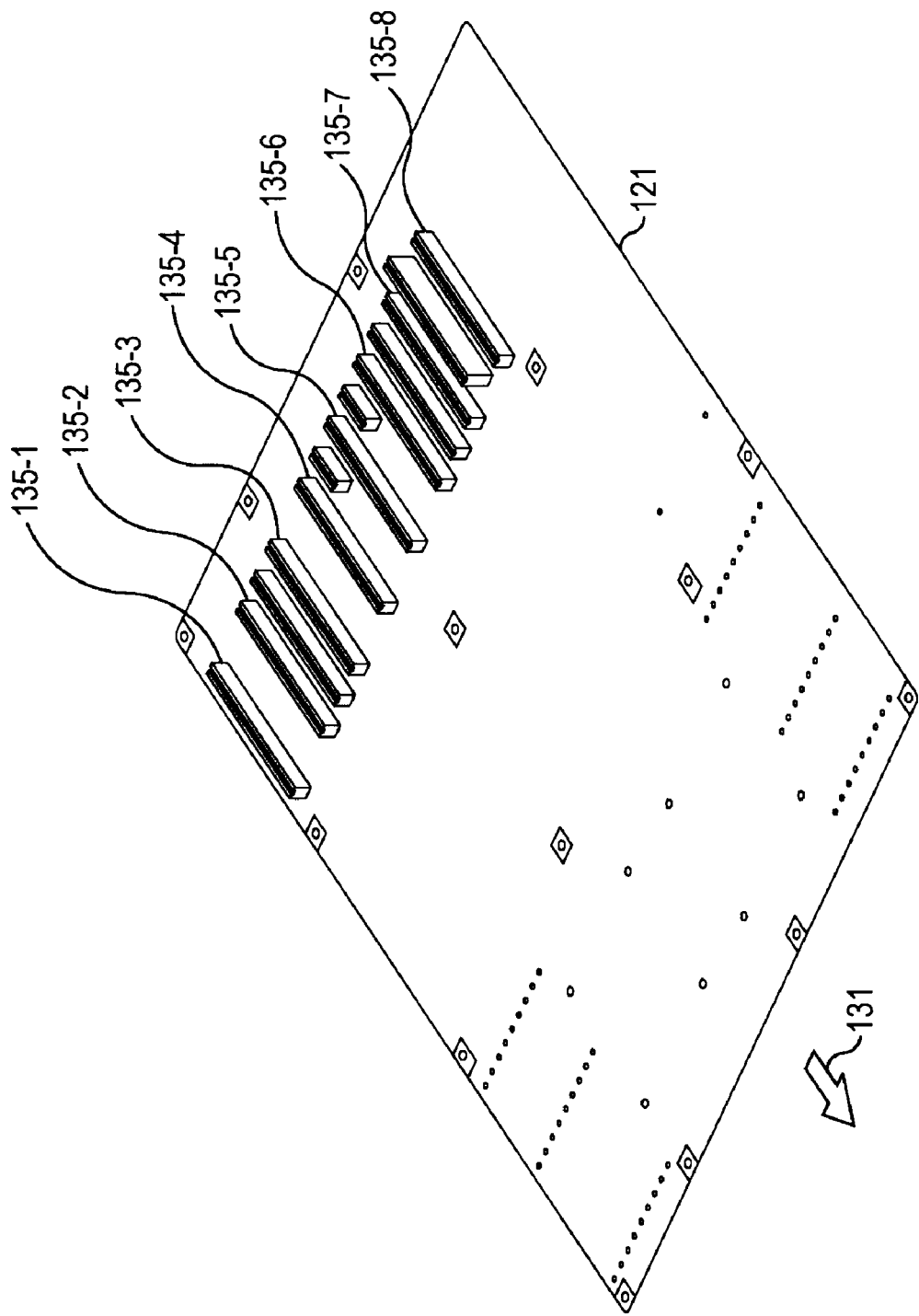
FIG. 4 is a perspective view showing an example of a part of the structure of a main board.

Next, the details of main components installed in the casing will be described. First, the main board 121 will be described. FIG. 4 is a perspective view showing an example of a part of the structure of the main board 121. In FIG. 4, an arrow 131 indicates the front (front surface) direction when the main board 121 is installed in the casing. As shown in FIG. 4, a slot 135-1 to a slot 135-8 as receiving ports of terminals of the expansion units 115, which are for electrically connecting the expansion units 115 to the main board itself 121, are provided at a rear part of the main board 121. Incidentally, in the following, when it is not necessary to distinguish between the slot 135-1 to the slot 135-8 when a description is made, each of them is simply called the slot 135.

The plural slots 135 are provided on the main board 121 to be arranged in the lateral direction so that the plural expansion units 115 can be arranged side by side as described with reference to FIG. 3. The slot 135 is a component compliant with a specified bus standard such as the PCI bus (Peripheral Components Interconnect bus) standard or PCI Express bus standard. That is, the electronic circuit of the main board 121 and the electronic circuit of the expansion unit 115 are connected through the specified standard bus.

The respective slots 135 are arranged at such intervals that at least the expansion units 115 can be installed. Incidentally, the number of the slots 135 is arbitrary as long as the expansion units 115 can be installed. For example, as shown in FIG. 4, a slot compliant with another standard may be further provided in addition to the slots 135. In this case, a component other than the expansion unit 115, such as a graphic board or a LAN (Local Area Network) board, can be electrically connected to the main board 121.

Incidentally, in FIG. 4, only the slots such as the slots 135 are shown on the main board 121, as stated above, various electronic components (heat generating elements as cooling targets) such as CPU, DRAM, LSI or IC are actually installed. Among these electronic components, one installed behind the air flow adjusting gate 114 is positioned at the lower side of the expansion unit 115 electrically connected to the main board 121. That is, this electronic component is limited to a component having such a size that it can be installed between the main board 121 and the expansion unit 115.

[Structure of the Air Flow Adjusting Gate]

Next, the air flow adjusting gate 114 will be described. FIGS. 5A and 5B are perspective views showing a structural example of the air flow adjusting gate 114. FIG. 5A is a perspective view in which the air flow adjusting gate 114 is seen from the back surface 100F side.

As shown in FIG. 5A, three legs, that is, a leg 151, a leg 152 and a leg 153 are provided at the lower part of the air flow adjusting gate 114. This is for providing a gap (opening part) between the air flow adjusting gate 114 and the main board 121. Although the leg 151 and the leg 152 are installed on the bottom surface 100E of the casing, the leg 153 is installed on the main board 121. The air flow adjusting gate 114 is disposed at the position higher than the main board 121 by the height of the leg 153, and a portion between the air flow adjusting gate 114 and the main board 121 becomes an opening part. By this, a part of the air flow flowing from the front to the air flow adjusting gate 114 passes through the opening part between the air flow adjusting gate 114 and the main board 121. This air flow cools the respective electronic circuits (heat generating elements behind the air flow adjusting gate 114) positioned below the expansion units 115 disposed in the inside of the casing.

Besides, in the air flow adjusting gate 114, an opening part 161 to an opening part 168 and a blocking part 171 to a blocking part 179 are alternately provided in the lateral direction. That is, a portion between the opening parts becomes the blocking part, and a portion between the blocking parts becomes the opening part.

The opening part 161 to the opening part 168 are ventilation holes for causing the air flow flowing from the front of the air flow adjusting gate 114 to flow to the expansion units 115. Although described later, a part or the whole of the front surface of the expansion unit 115 is opened. The opening part 161 to the opening part 168 correspond to the respective opening parts of the expansion unit 115-1 to the expansion unit 115-8, and are provided at such positions that most of the air flow passing through the opening part 161 to the opening part 168 flows into the insides of the corresponding expansion units 115.

In other words, the blocking part 171 to the blocking part 179 are covers to prevent the air flow flowing from the front of the air flow adjusting gate 114 from flowing to portions other than the expansion units 115 (flow to the other portions is suppressed). That is, the air flow adjusting gate 114 controls so that a part or the whole of the air flow passing through the air flow adjusting gate 114 flows to a desired portion behind the air flow adjusting gate 114.

Incidentally, the shape, size, position, number or the like of the opening parts and the blocking parts of the air flow adjusting gate 114 are all arbitrary. In other words, the flow destination, air amount, air pressure and the like of the air flow passing through the air flow adjusting gate 114 can be controlled by the shape, size, position, number or the like of the opening parts and the blocking parts. Further, the flow destination, air amount, air pressure and the like of the air flow passing through the air flow adjusting gate 114 can be controlled also by, for example, the positional relation between the opening part of the air flow adjusting gate 114 and the opening part of the expansion unit 115.

As shown in FIG. 5A, a guide part 181 to a guide part 189, which are protrusions to fix the expansion units to specified positions, are provided on the blocking part 171 to the blocking part 179 of the air flow adjusting gate 114, respectively. When the expansion units 115 are installed to be electrically connected to the main board 121, the guide part 181 to the guide part 189 guide the expansion units 115 to the specified positions. More specifically, for example, when the expansion unit 115-1 is installed to be electrically connected to the main board 121, the guide part 181 and the guide part 182 guide so that the front portion of the expansion unit 115-1 is installed at a specified position (between the guide part 181 and the guide part 182).

Further, the guide part 181 to the guide part 189 fix the expansion units 115, which are installed to be electrically connected to the main board 121, such that the expansion units are respectively sandwiched therebetween in the right-and-left direction. Incidentally, it is desirable that the guide part 181 to the guide part 189 are made of soft material such as rubber or plastic so as not to damage the expansion units 115.

Besides, a board 191 and a terminal 192 are provided at the upper part of the air flow adjusting gate 114. Further, as shown in FIG. 5B which is a perspective view of the air flow adjusting gate 114 seen from the front direction, a terminal 193-1 to a terminal 193-8 are provided at the lower part of the board 191.

The terminal 192 is the terminal to receive power from the power unit. An electronic circuit to supply power to the expansion unit 115 is formed on the board 191. As shown in FIG. 5B, by these structures, the power is supplied from the terminal 192 to the terminal 193-1 to the terminal 193-8 through the board 191. The terminal 193-1 to the terminal 193-8 are electrically connected to the power terminals of the expansion units 115 by cables. That is, the power is supplied to the expansion units 115 through the air flow adjusting gate 114.

The front of the expansion unit 115 is fixedly supported by the air flow adjusting gate 114. That is, as shown in FIG. 2 and FIG. 4, all the expansion units 115 are disposed side by side with respect to the air flow adjusting gate 114. Thus, when power is supplied to the respective expansion units 115 through the air flow adjusting gate 114, as compared with the case where power is supplied from the power source unit 116 by cables directly connected to the respective expansion units 115, the wiring which may hinder the air flow can be simplified. That is, the cooling efficiency can be improved. Besides, since the assembly process is facilitated by simplification of the wiring, the manufacture cost can be reduced.

Figure 6A:
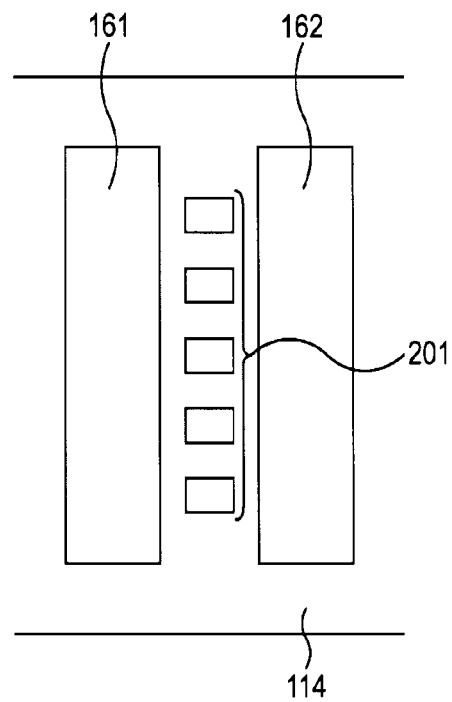
FIGS. 6A and 6B are views for explaining the structure of a part of the air flow adjusting gate of FIGS. 5A and 5B.
Figure 6B:
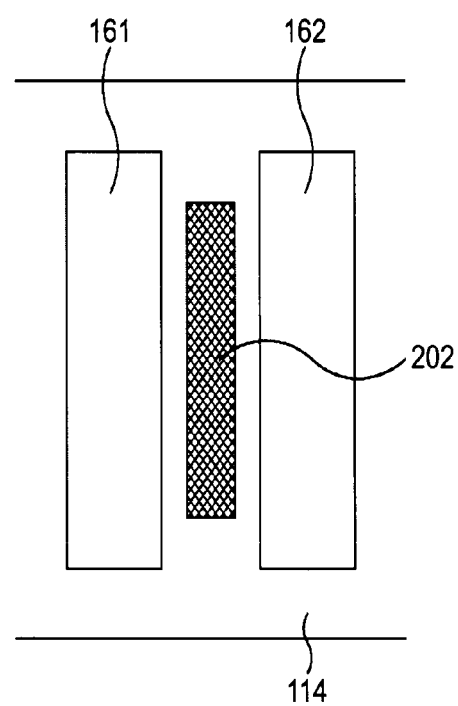

FIGS. 6A and 6B are views for explaining a partial structure of the air flow adjusting gate 114 of FIGS. 5A and 5B. As shown in FIG. 6A, one or plural opening parts 201 may be provided in a blocking part, or as shown in FIG. 6B, a lattice 202 may be provided. That is, the passing of the air flow is not merely suppressed by the blocking part, but a part of the air flow is made to pass through, and the partial air flow may be positively supplied to the outside of the expansion unit 115 such as a portion between the expansion units 115.

In the case of FIGS. 5A and 5B, the air flow adjusting gate 114 uses the blocking part 171 to the blocking part 179 and controls so that the air flow does not basically flow into the portion between the expansion units 115 arranged side by side. Although the structure of the expansion unit 115 will be described later, the expansion unit 115 is basically provided with a heat generating element as a cooling target in the inside. Accordingly, the air flow adjusting gate 114 controls so that most of the air flow is positively sent into the insides of the expansion units 115 by the opening part 161 to the opening part 168 and the blocking part 171 to the blocking part 179.

That is, in this case, although there is a case where a part of the air flow resultantly flows between the expansion units 115, the air flow is not at least positively sent. Thus, there is a fear that the direction, air amount, air pressure and the like of the air flow flowing between the expansion units 115 are weak or unstable.

However, a heat generating element as a cooling target may be provided on the outer surface of the expansion unit 115. In that case, the heat generating element as the cooling target exists also between the expansion units 115. In such a case, a sufficient cooling efficiency is not necessarily obtained by the unintentional air flow as stated above.

Then, in such a case, the blocking part 171 to the blocking part 179 of the air flow adjusting gate 114 are made to have the structure as shown in FIG. 6A or FIG. 6B, so that the air flow is positively sent also between the expansion units 115. By this, the air flow adjusting gate 114 can sufficiently cool the heat generating element as the cooling target provided on the outside of the expansion unit.

[Structure of the Expansion Unit]

Figure 7:
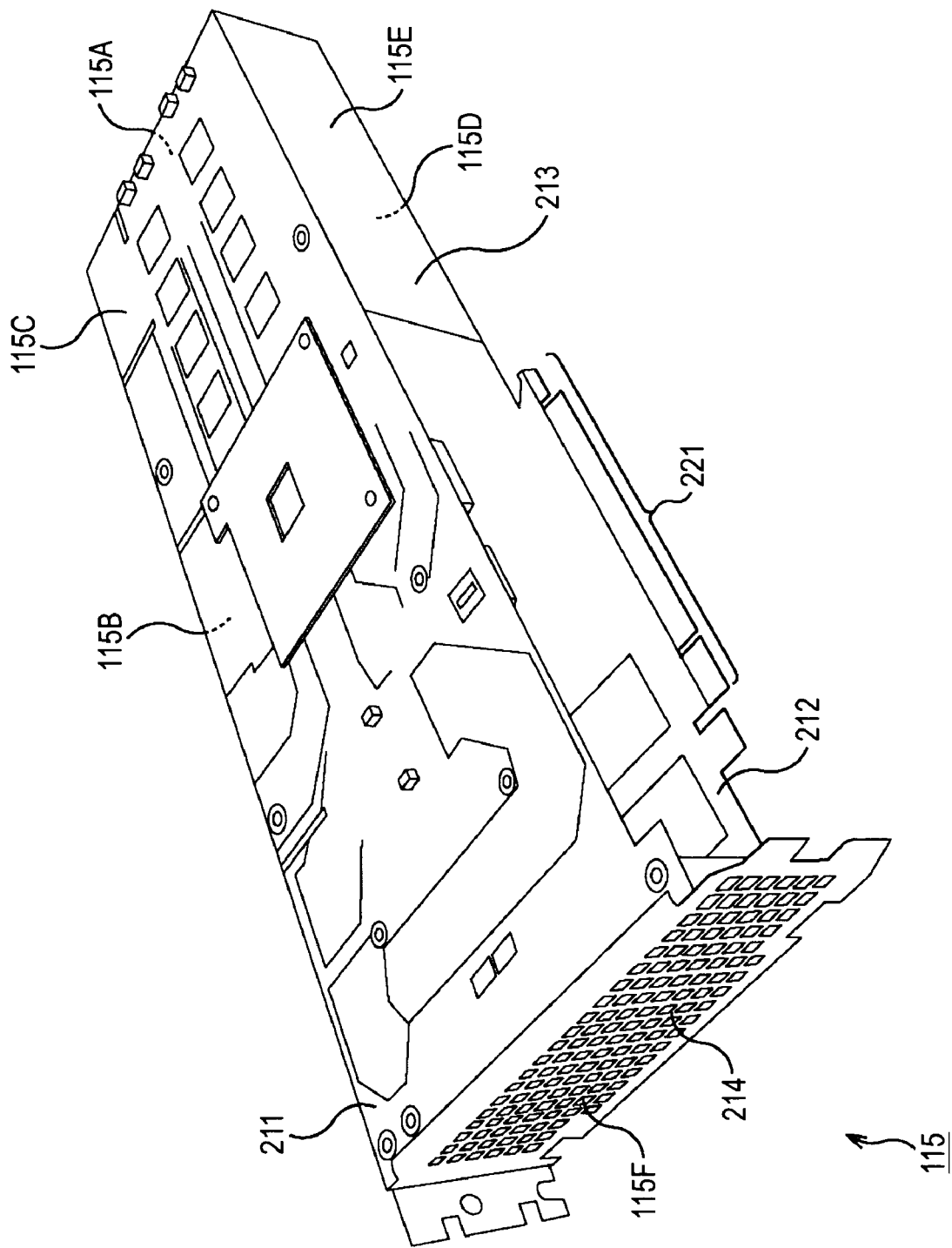
FIG. 7 is a perspective view showing a structural example of an expansion unit.
Figure 8:
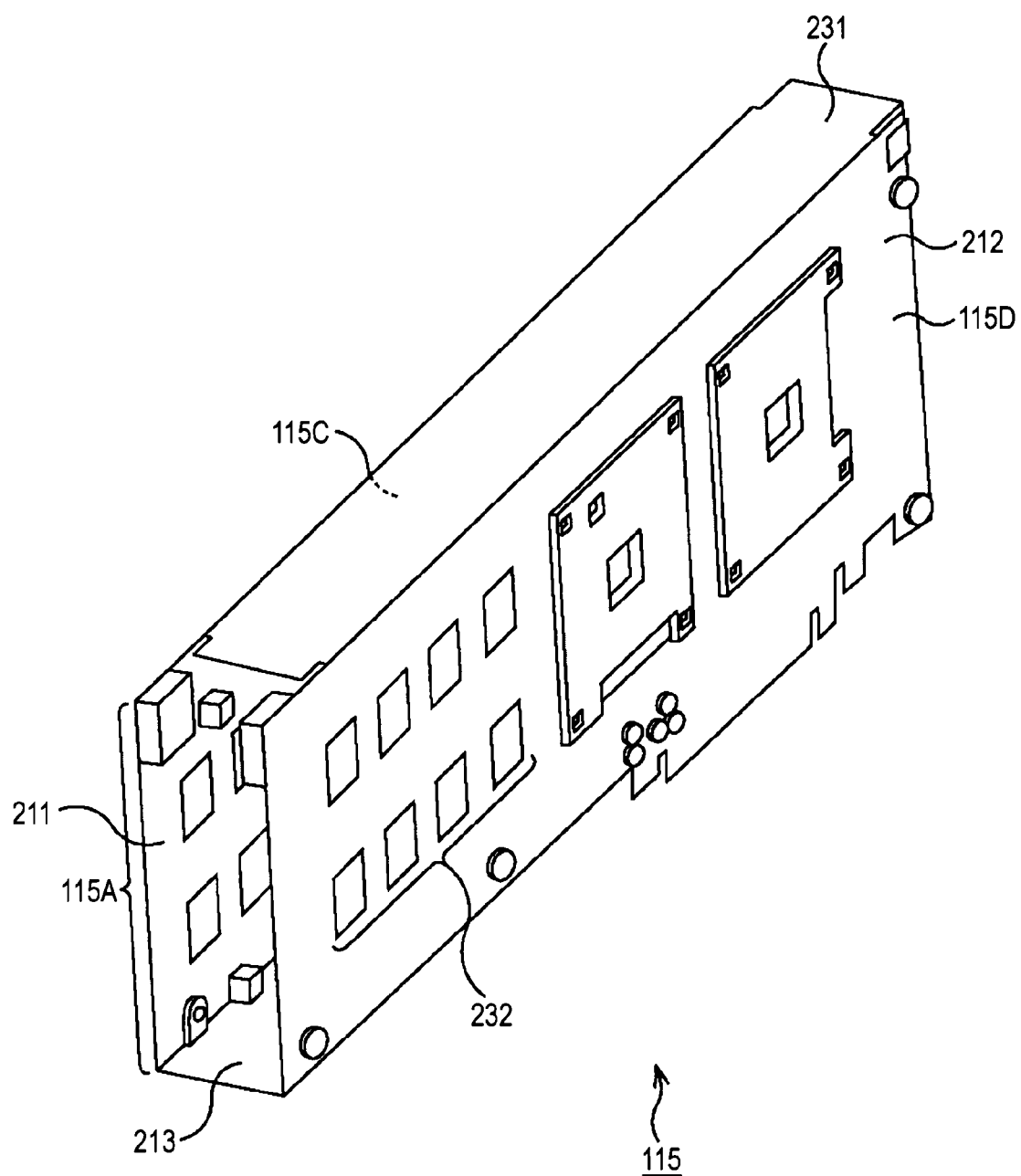
FIG. 8 is a perspective view in which the expansion unit of FIG. 7 is seen in a different direction.

Next, the expansion unit 115 will be described. FIG. 7 and FIG. 8 are perspective views showing a structural example of the expansion unit. As shown in FIG. 7, the expansion unit 115 is formed into a substantially rectangular parallelepiped box shape while two boards arranged in parallel to each other are two side surfaces opposite to each other.

As shown in FIG. 7 and FIG. 8, a board 211 (FIG. 7) forming a left side surface 115G positioned at an upper side and a board 212 forming a right side surface 115D (FIG. 7) positioned at a lower side are physically connected by an upper plate 231 (FIG. 8) forming an upper surface 115B, a lower plate 213 (FIG. 7) forming a part of a bottom surface 115E and a back plate 214 (FIG. 7) forming a back surface 115F, and the substantially rectangular parallelepiped box-shaped (hollow) expansion unit 115 is formed. That is, the board 211 and the board 212 themselves are formed as part of the casing of the expansion unit 115.

An arbitrary electronic component, such as CPU, RAM, ROM (Read Only Memory) or chip set, is suitably mounted on the board 211 and the board 212, and a specified electronic circuit is formed. The board 211 and the board 212 are electrically connected to each other by a specified flexible cable (not shown) or the like. Besides, the board 212 is provided with a terminal 221 corresponding to the slot 135 on the main board 121. That is, the board 212 (electronic circuit thereof) is electrically connected to the main board 121 (electronic circuit thereof). Besides, the board 211 (electronic circuit thereof) is electrically connected to the main board 121 (electronic circuit thereof) through the board 212 (electronic circuit thereof).

For example, it is assumed that a CPU, RAM or the like is mounted on each of the board 211 and the board 212. The CPU performs specified processing such as image processing in accordance with the control or data supplied from a CPU mounted on the main board 121, and supplies the processing result to the CPU of the main board 121. As stated above, the CPU of the expansion unit 115 performs part of the processing, so that the load of the CPU of the main board 121 can be reduced. Besides, the expansion unit 115 performs a special processing which can not be executed in the electronic circuit of the main board 121, and can also provide the processing result. That is, the expansion unit 115 can expand the function of the electronic circuit of the main board 121 by the electronic circuit mounted on the expansion unit 115.

As shown in FIG. 8, a part or the whole of the front surface 115A of the expansion unit 115 is opened. Besides, the back plate 214 forming the back surface 115F is formed into a lattice shape (net shape), and ventilation can be performed. As shown in FIG. 7, the inside of the expansion unit 115 is hollow. That is, the expansion unit 115 is formed into a hollow shape like a duct in which two surfaces in the front-and-back direction are opened, and the air flow for ventilation is sucked from the opened front surface 115A and is exhausted from the back plate 214.

The electronic component (heat generating element of the cooling target) of the board 211 or the board 212 is mainly mounted on the inside of the expansion unit 115. That is, the electronic component (heat generating element of the cooling target) is mounted in the portion through which the air flow passes.

Figure 9:
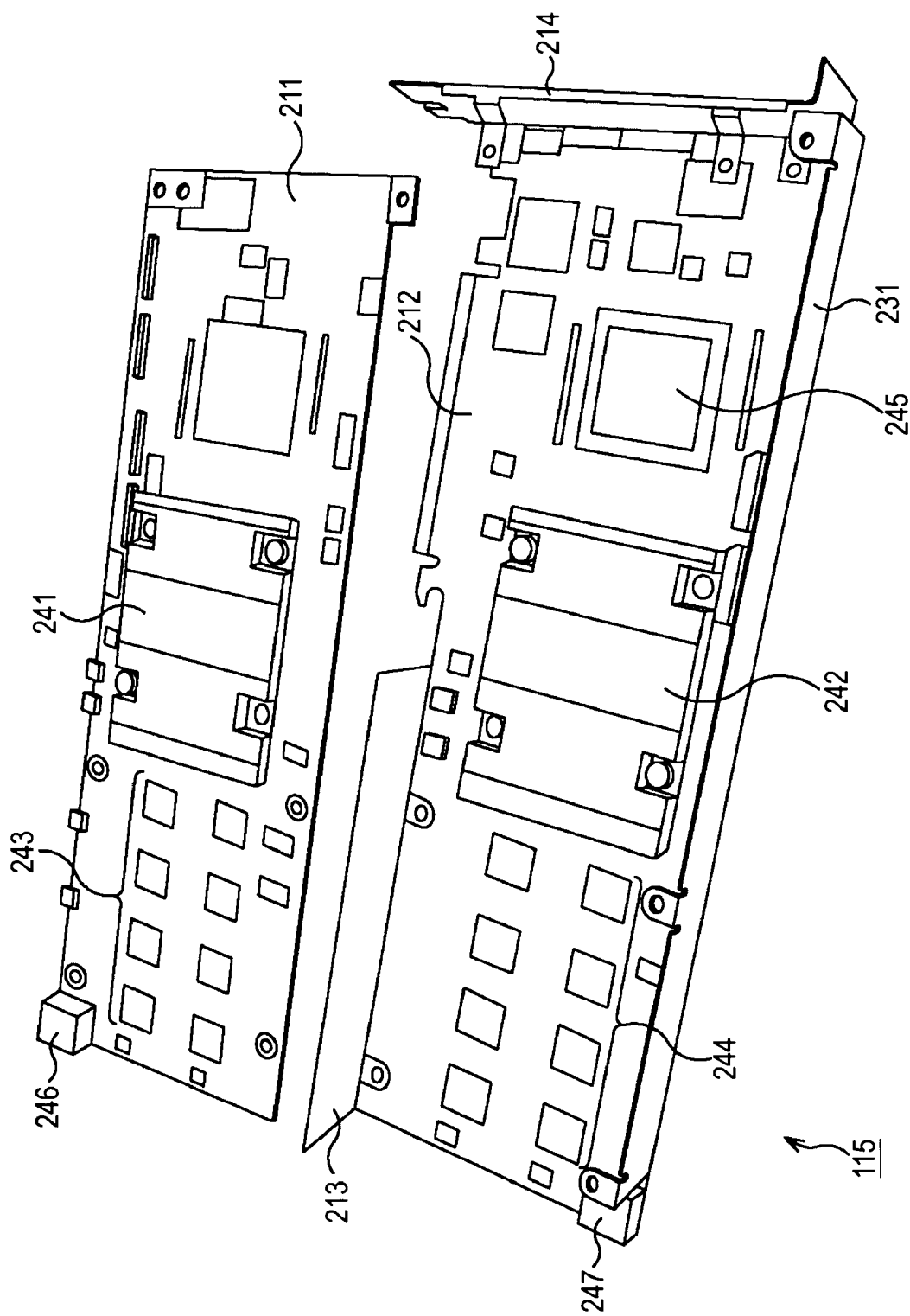
FIG. 9 is a view for explaining the structure of the inside of the expansion unit.

FIG. 9 is a view for explaining the inside structure of the expansion unit 115. As shown in FIG. 9, main electronic components having a large heat generation amount, such as a CPU heat sink 241, a CPU heat sink 242, plural RAMs 243, plural RAMs 244, and a chip set (south bridge) LSI 245, are mounted on the surfaces of the board 211 and the board 212, which become the inside of the casing.

Besides, the board 211 is provided with a terminal 246 for power source. Similarly, the board 212 is provided with a terminal 247 for power source. These terminals 246 and 247 are connected to the terminal 193 of the air flow adjusting gate 114 by a dedicated cable or the like. That is, the electronic circuit mounted on the board 211 is driven by power supplied through the terminal 246. Similarly, the electronic circuit mounted on the board 212 is driven by power supplied through the terminal 247.

As stated above, in the expansion unit 115, the heat generating elements as the cooling targets are converged on the inside, and the inside is ventilated, so that cooling is efficiently performed. In general, the electronic component as the heat generating element has a three-dimensional shape. Besides, according to circumstances, a three-dimensional object such as a heat sink is provided. Accordingly, there is a fear that the air flow is stopped by these components or the direction thereof is changed. At this time, when the board 211 and the board 212 are merely arranged side by side, the air flow is released in the up-and-down direction, and there is a fear that all electronic components on the board 211 and the board 212 can not be sufficiently cooled.

In the case of the expansion unit 115, since it is surrounded by the upper plate 231 and the lower plate 213 in the up-and-down direction, the outflow of the air flow in the up-and-down direction can be suppressed. That is, most of the air flow flowing into the expansion unit 115 from the front surface 115A can be exhausted from the back plate 214. By this, the air flow can be made to circulate around substantially the whole inside of the expansion unit 115, and the respective electronic components mounted on the board 211 and the board 212 can be sufficiently cooled.

Besides, as stated above, the shape of the expansion unit 115 is the substantially rectangular parallelepiped box shape and is very simplified. Accordingly, since ventilation is performed in a straight direction from the front surface to the back surface, the occurrence of air accumulation or the like can be more easily suppressed. Besides, by the simplification of the shape and the number of components, it is possible to realize simplification of the assembly process of the expansion unit 115, reduction in manufacture cost, miniaturization of the expansion unit 115, increase in density of electronic circuits mounted on the expansion unit 115, and the like.

Further, among the respective surfaces of the casing of the expansion unit 115, the board 211 and the board 212 themselves on which the electronic circuits are mounted are used as the left side surface 115C and the right side surface 115D. Accordingly, as compared with the case where the board 211 and the board 212 are installed in a box-shaped casing, the number of components can be reduced, the assembly process can be more simplified, and the manufacture cost can be more reduced.

Besides, for example, there is a method in which a dedicated blower (fan) is provided for the extension board, the air flow is generated by the blower, and the electronic component (heat generating element) on the extension board is cooled. However, in this case, when plural extension boards are arranged side by side, a space where the blower is installed and a space where the blower sucks air are required to be provided between the extension boards. That is, there is a fear that the density of mountable electronic circuits becomes low in the casing of the information processing apparatus 100. Besides, since the number of components is increased by the blower or the like, there is a fear that the manufacture cost is increased. Further, a physically driven mechanism such as the blower has a high failure rate, and there is a fear that the reliability of the information processing apparatus 100 is reduced.

On the other hand, the structure of the expansion unit 115 is simplified, and as long as cooling is suitably performed, the reliability higher than the case where the blower is provided can be easily obtained.

Incidentally, as described with reference to FIG. 6, a heat generating element as a cooling target may be mounted on the outside surface of the casing of the expansion unit 115. For example, as shown in FIG. 7 and FIG. 8, plural RAMs 232 may be provided. In this case, when the expansion units 115 are suitably installed in the casing of the information processing apparatus 100, the heat generating element as the cooling object exists between the expansion units 115. Thus, it is desirable that the space between the expansion units 115 is also positively ventilated by providing the opening part 201 or the lattice 202 as shown in FIG. 6A or 6B in the blocking part of the air flow adjusting gate 114.

Incidentally, although heat generating elements as cooling targets are mounted also on the portions of the main board 121 under the expansion units 115, since the air flow adjusting gate 114 is installed to form a gap between itself and the main board 121, those heat generating elements on the main board 121 are sufficiently cooled by the air flow passing through the lower side of the air flow adjusting gate 114. At this time, a space in the up-and-down direction is surrounded by the expansion unit 115 and the main board 121. Thus, the air flow passing through the lower side of the air flow adjusting gate 114 does not escape halfway, but is supplied to the back plate 117, and is exhausted to the outside of the casing through the opening part of the back plate 117. That is, those heat generating elements on the main board 121 are sufficiently cooled.

Besides, although the shape and size of the expansion unit 115 influence not only the cooling function but also the size of the casing and manufacture cost, they are basically arbitrary, and the shape may not be necessarily the substantially rectangular parallelepiped box shape. The air flow control may be suitably performed by the shape and size so that cooling can be efficiently performed according to the arrangement of the electronic components in the electronic circuit in the inside of the expansion unit 115.

As described above, in addition to the improvement of the cooling efficiency, various effects as stated above can be obtained by simplifying the shape of the expansion unit 115. However, there is a fear that the inside of the expansion unit 115 can not be sufficiently ventilated when the shape of the expansion unit 115 is merely simplified. Then, the air flow adjusting gate 114 is provided, and the airflow from the front direction is suitably sent to the inside of the expansion unit 115. By this, since the heat generating element of the cooling target of the expansion unit 115 can be sufficiently cooled, the density of electronic circuits can be further increased.

Incidentally, as described above, the air flow adjusting gate 114 performs the fixing of the expansion unit 115 and the power supply (transmission from the power source unit 116) to the expansion unit 115 in addition to the air flow control. By this, various effects, such as simplification of the assembly process of the information processing apparatus 100 and reduction in manufacture cost, as described above can be obtained.

Besides, in the information processing apparatus 100, the plural expansion units 115 are efficiently arranged as shown in, for example, FIG. 3. That is, it is possible to realize the simplification of assembly process, higher density of electronic circuits, reduction in size of the casing, and reduction in manufacture cost. Further, since the arrangement structure is simplified, the direction of ventilation can be simplified into the straight direction from the front surface to the back surface. By this, efficient cooling can be performed.

[Installation of the Expansion Unit]

Figure 10:
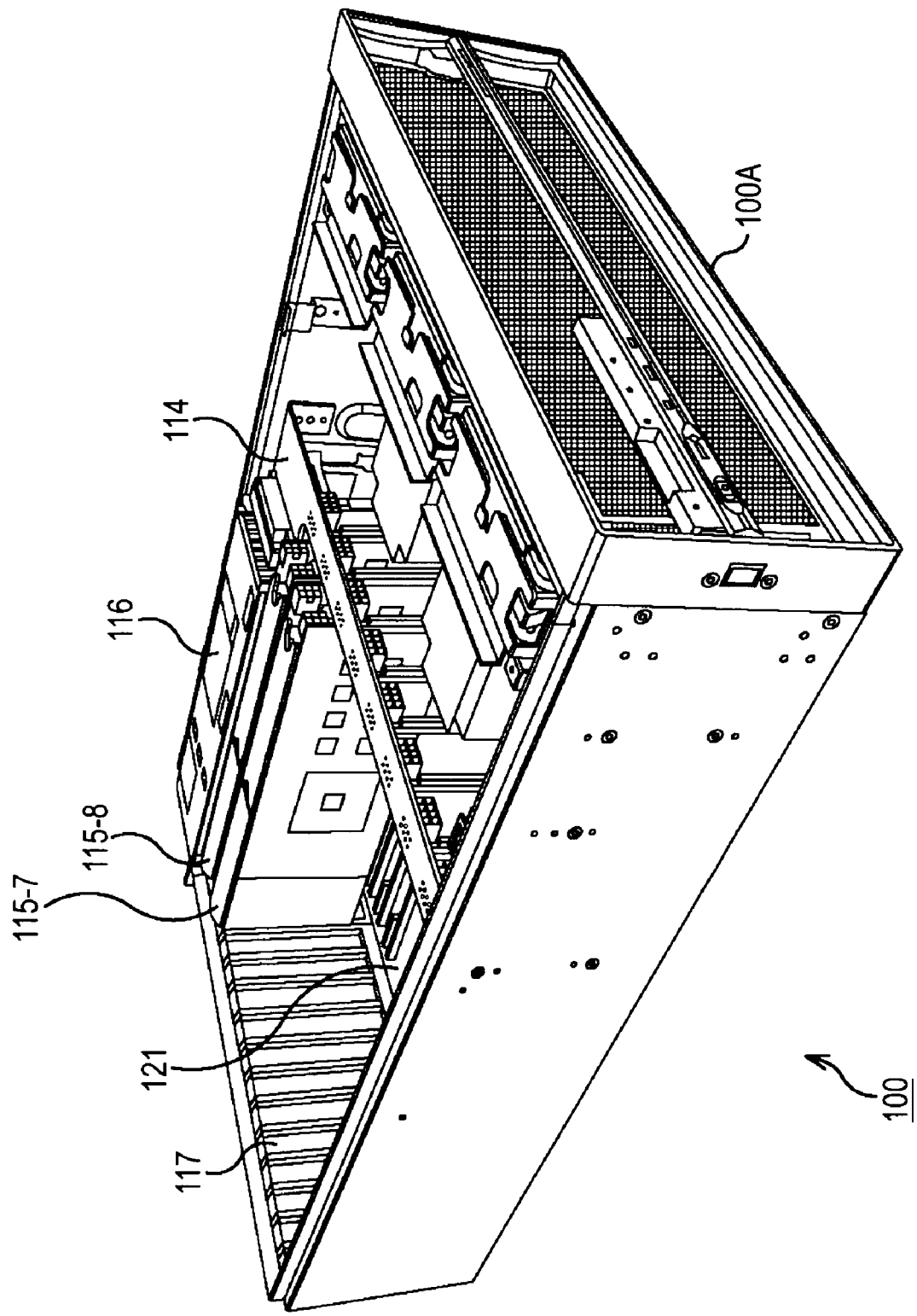
FIG. 10 is a perspective view for explaining the structure of the inside of the casing of the electronic equipment.
Figure 11:
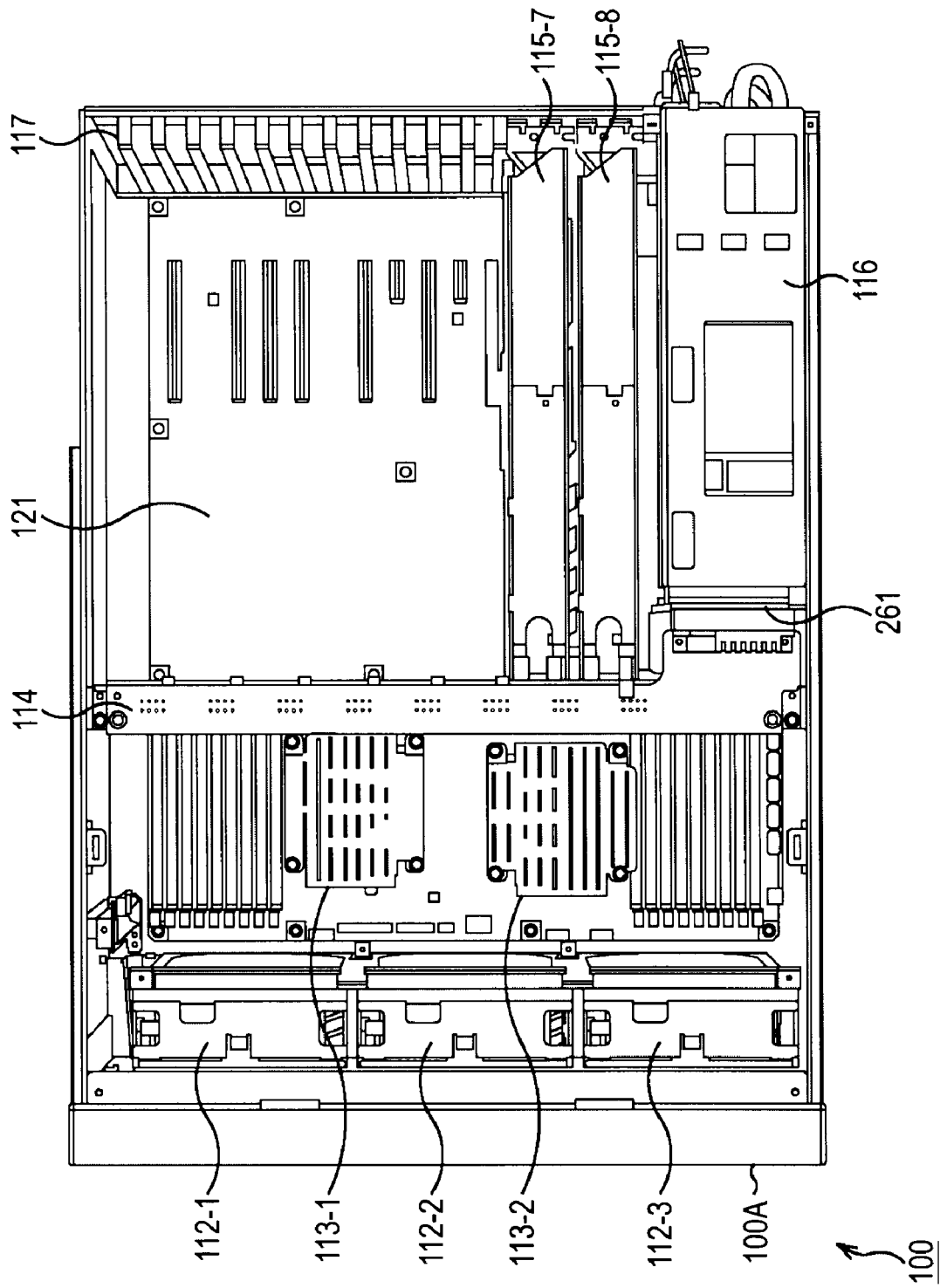
FIG. 11 is a top view for explaining the structure of the inside of the casing of the electronic equipment.

Incidentally, for example, as shown in FIG. 3, although at maximum eight expansion units 115 can be mounted in the information processing apparatus 100, for example, less than eight expansion units 115 may be mounted as shown in FIG. 10 and FIG. 11. That is, the number of the mounted expansion units 115 is arbitrary as long as it is not larger than the maximum number, and may be a suitable number according to processing content or the like.

In the case of the example of FIG. 10 and FIG. 11, two expansion units, that is, an expansion unit 115-7 and an expansion unit 115-8 are installed. Of course, the number of the installed expansion units 115 may be three or more, or may be one. Besides, the installation position is also arbitrary, and the expansion unit 115 may be connected to any slot 135.

As stated above, irrespective of the number of the installed expansion units 115 and the installation position, the change of layout in the casing of the information processing apparatus 100 is such a degree that the position of the expansion unit 115 is changed, and the layout does not basically much change. Accordingly, the direction of the air flow in ventilation is also constant (one direction from the front side to the back side). That is, basically, it is not necessary to change the air flow control method according to the number of the installed expansion units 115 and the installation position. Accordingly, the suitable air flow control can be easily realized in the information processing apparatus 100.

Incidentally, in FIG. 11, although the power source unit 116 is electrically connected to the main board 121 and the air flow adjusting gate 114, the connection is performed through a board 261 having plural terminals. The board 261 is provided with at least a terminal for the power source unit 116, a terminal for the main board 121, and a terminal for the air flow adjusting gate 114. Even if the standards of the power source terminals are not unified, the air flow adjusting gate 114, the power source unit 116 and the main board 121 can be easily electrically connected to each other by mutually connecting them through this board 261.

Incidentally, this board 261 is connected to the main board 121, the air flow adjusting gate 114 and the power source unit 116 through the terminals and is held in three directions at this time, and the position is fixed. Accordingly, it is not necessary to fix the board 261 to the casing by screwing or the like. That is, the assembly process becomes easy, an unnecessary component such as a screw can be omitted, and the manufacture cost can be reduced.

[Description of the State of the Air Flow]

Figure 12:
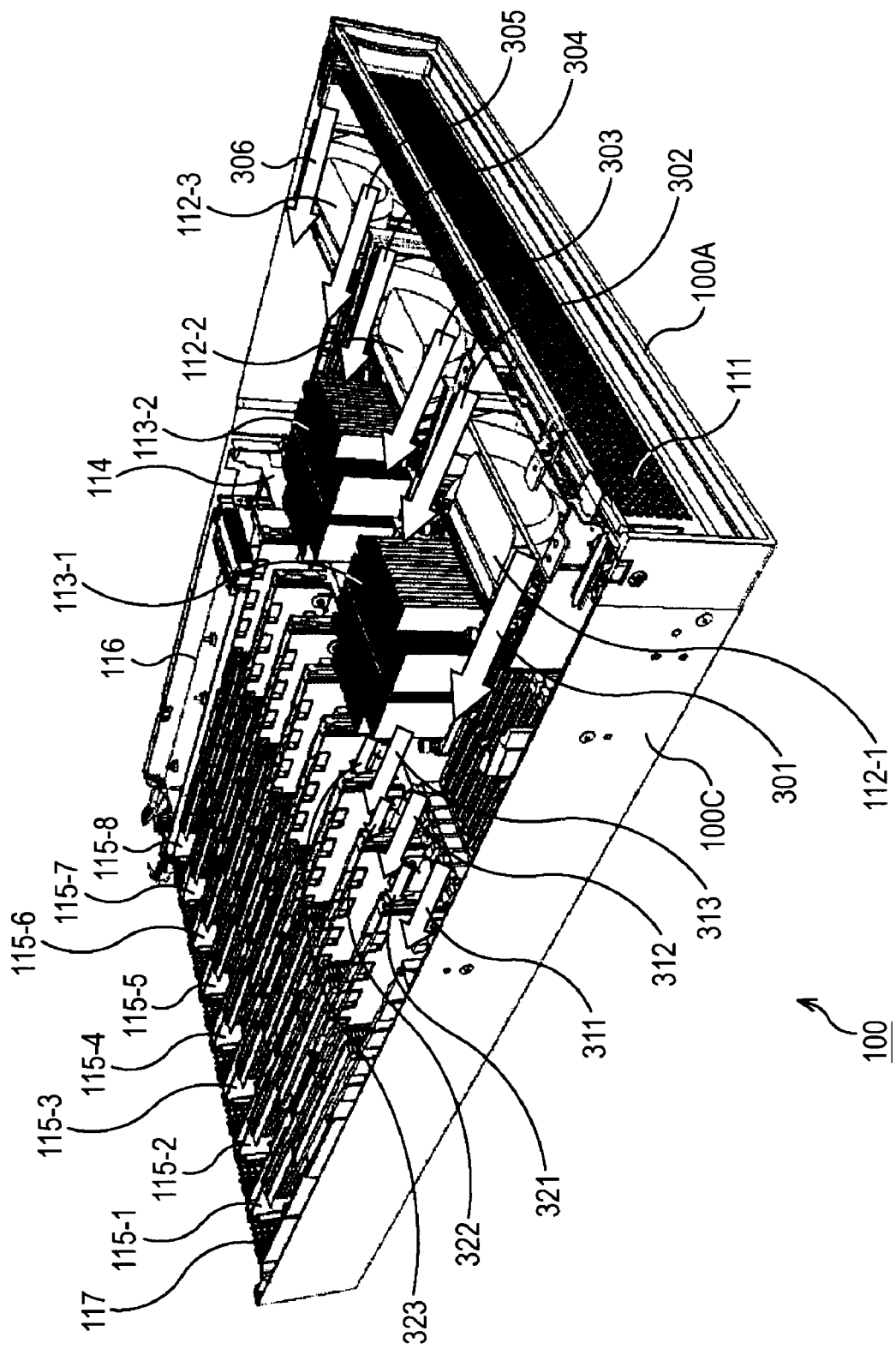
FIG. 12 is a horizontal sectional view of the electronic equipment.

Next, the flow of air flow will be described in more detail. FIG. 12 is a horizontal sectional view of the electronic equipment. Arrows shown in FIG. 12 indicate an example of the flow of the air flow. When the blower 112-1 to the blower 112-3 at the front of the casing are driven, as indicated by an arrow 301 to an arrow 306, air outside the casing is sucked through the front plate 111 of the front surface 100A, and the air is sent behind the blowers in the inside of the casing.

The air flow generated as described above reaches the air flow adjusting gate 114 while cooling the heat generating elements on the main board 121, such as the CPU heat sink 113-1 and the CPU heat sink 113-2.

Figure 13:
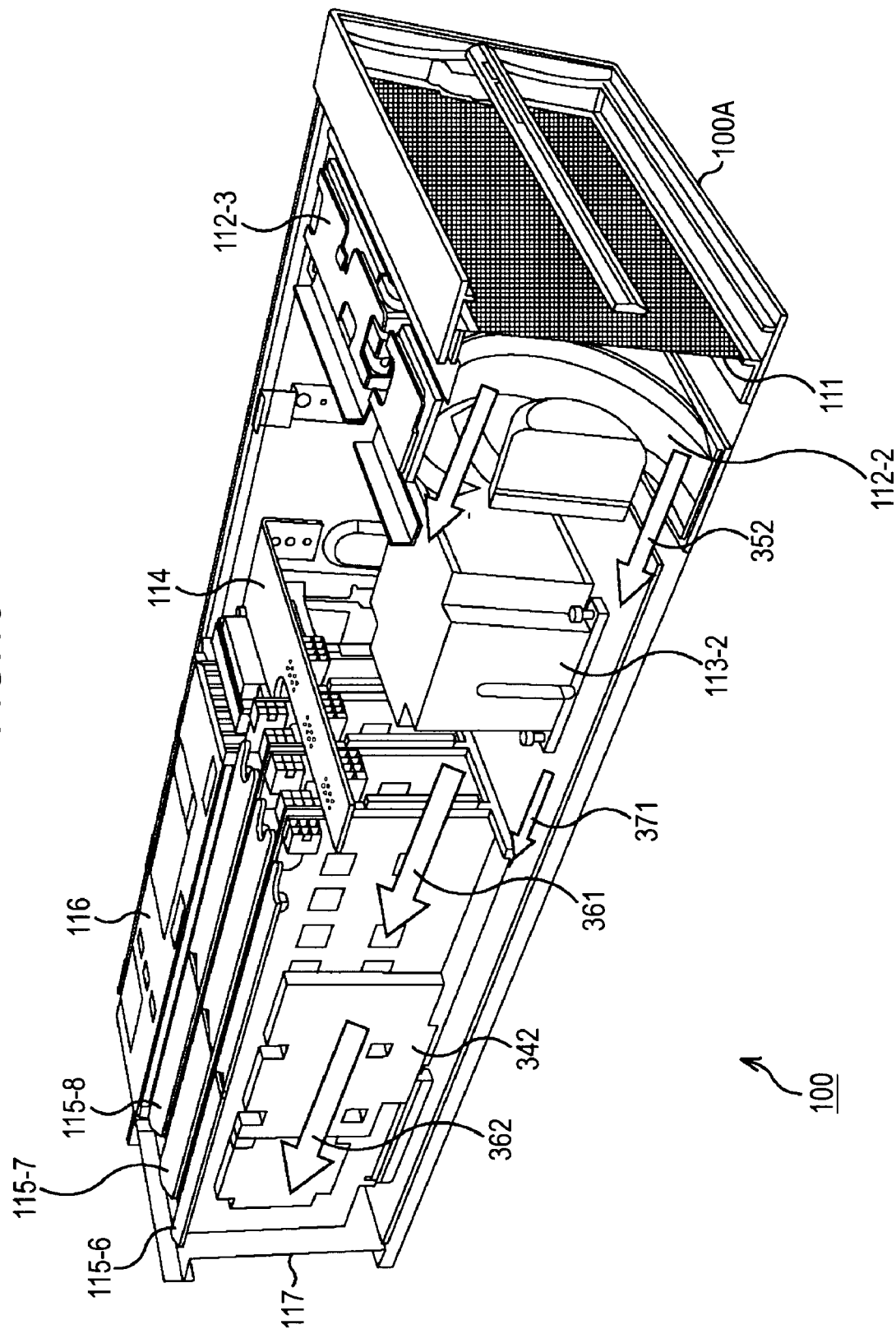
FIG. 13 is a vertical sectional view of the electronic equipment.

For example, as indicated by an arrow 311 to an arrow 313, the air flow adjusting gate 114 guides most of the air flow to the inside of the expansion unit 115 by the structure of the opening part and the blocking part. FIG. 13 is a vertical sectional view of the electronic equipment. Arrows shown in FIG. 13 indicate an example of the flow of air flow. For example, the air flow sent into the inside of the expansion unit 115 by the air flow adjusting gate 114 as indicated by an arrow 361 of FIG. 13 reaches the back plate 214 while cooling the heat generating elements in the inside of the expansion unit 115 as indicated by an arrow 362, and is exhausted through the back plate 214. The air flow is exhausted to the outside of the casing through the opening part of the back plate 117 of the back surface 100F of the information processing apparatus 100.

Besides, for example, as indicated by an arrow 321 to an arrow 323 of FIG. 12, the air flow adjusting gate 114 guides part of the air flow to a gap between the expansion units 115 by the structure of the blocking part. This air flow reaches the back plate 117 while cooling the heat generating elements provided outside the expansion unit 115, and is exhausted to the outside of the casing through the back plate 117.

Further, for example, as indicated by an arrow 371 of FIG. 13, the air flow adjusting gate 114 guides part of the air flow supplied from the front side to a gap between the expansion unit 115 and the main board 121 by the structure of the blocking part and the like. This air flow reaches the back plate 117 while cooling the heat generating elements provided on the main board 121, and is exhausted to the outside of the casing through the back plate 117.

As shown in FIG. 12 and FIG. 13, the respective components are constructed and arranged so that the air flow basically flows from the front direction to the back direction in any portion in the inside of the casing of the information processing apparatus 100. As described above, by simplifying the flow of the air flow, the information processing apparatus 100 can more easily and efficiently cool the heat generating elements in the inside of the casing.

2. Second Embodiment

[Structure of the Electronic Equipment]

Figure 14:
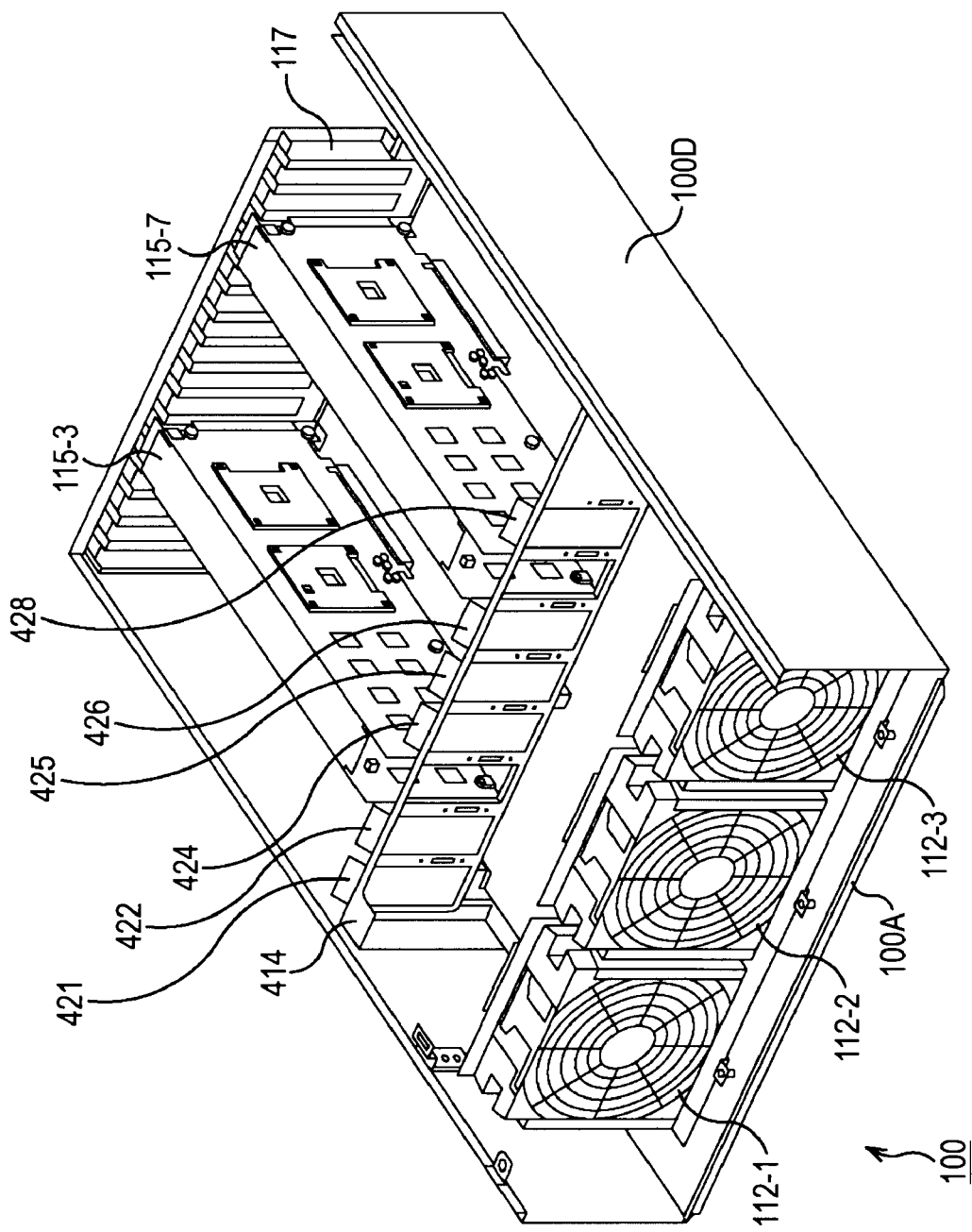
FIG. 14 is a perspective view showing another structural example of the inside of a casing of an electronic equipment.

Incidentally, the opening part of the air flow adjusting gate 14 to which the expansion unit 115 is not provided may be closed. FIG. 14 is a perspective view showing another structural example of the inside of a casing of an information processing apparatus 100. Incidentally, a structure unnecessary for a description is suitably omitted. In the case of the example of FIG. 14, instead of the air flow adjusting gate 114, an air flow adjusting gate 414 is provided in the inside of the casing of the information processing apparatus 100.

The structure of the air flow adjusting gate 414 is basically the same as that of the air flow adjusting gate 114 except that movable covers 421 to 428 are provided in respective opening parts.

The cover 421 is a member to block an opening part 161 when an expansion unit 115-1 is not installed so as to correspond to the opening part 161. Similarly to the case of the cover 421, a cover 422 is a member to block an opening part 162 as the need arises. Similarly, a cover 423 is a member to block an opening part 163 as the need arises. Similarly, a cover 424 is a member to block an opening part 164 as the need arises, a cover 425 is a member to block an opening part 165 as the need arises, and a cover 426 is a member to block an opening part 166 as the need arises. Similarly, a cover 427 is a member to block an opening part 167 as the need arises, and a cover 428 is a member to block an opening part 168 as the need arises.

When the expansion units 115 are installed, the cover 421 to the cover 428 are pressed and opened by the casings of the installed expansion units 115. That is, the opening part to which the expansion unit 115 is installed is put in an open state similarly to the case where the description is made with reference to FIG. 1 to FIG. 13.

For example, as shown in FIG. 14, when only part of the expansion units 115 are installed, the opening part to which the expansion unit 115 is not installed is closed by the cover. In the case of the example of FIG. 14, the cover 421, the cover 422, the cover 424, the cover 425, the cover 426 and the cover 428 close the respective opening parts. On the other hand, the expansion unit 115-3 is installed to the opening part 163, the cover 423 (not shown) is pressed and opened by the expansion unit 115-3, and the opening part 163 is put in the open state. Besides, the expansion unit 115-7 is installed to the opening part 167, the cover 427 (not shown) is pressed and opened by the expansion unit 115-7, and the opening part 167 is put in the open state.

As stated above, when the opening part to which the expansion unit 115 is not installed is closed, the air flow adjusting gate 414 can suppress the air blow to the unnecessary portion where a heat generating element does not exist, and can supply more air flow to the portion requiring cooling. That is, the air flow adjusting gate 414 can control the air flow to more efficiently cool the heat generating element in the inside of the casing.

[Installation of the Expansion Unit]

Figure 15:
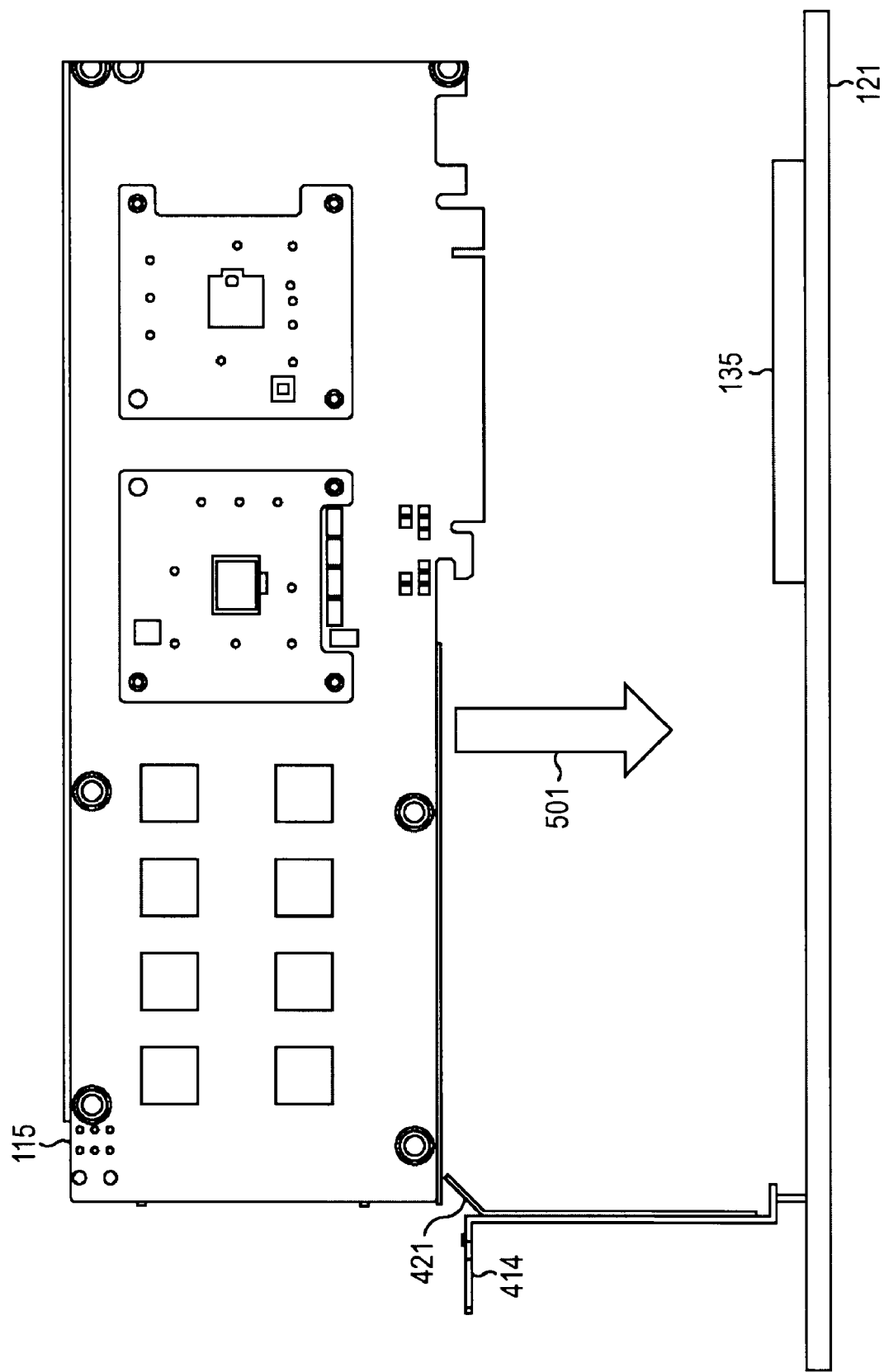
FIG. 15 is a view for explaining a state of installation of the expansion unit.
Figure 16:
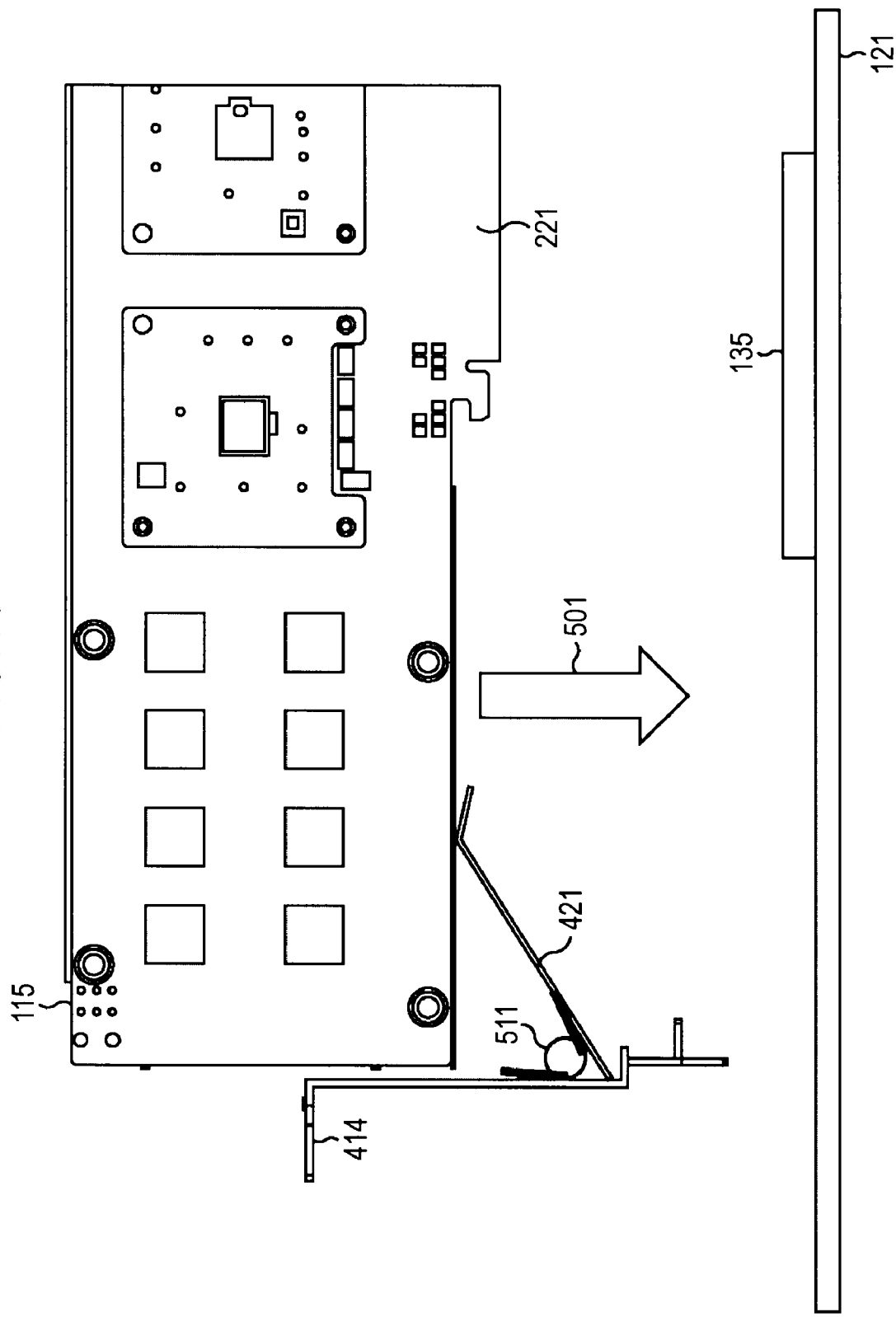
FIG. 16 is a view for explaining the state of the installation of the expansion unit and is subsequent to FIG. 15.
Figure 17:
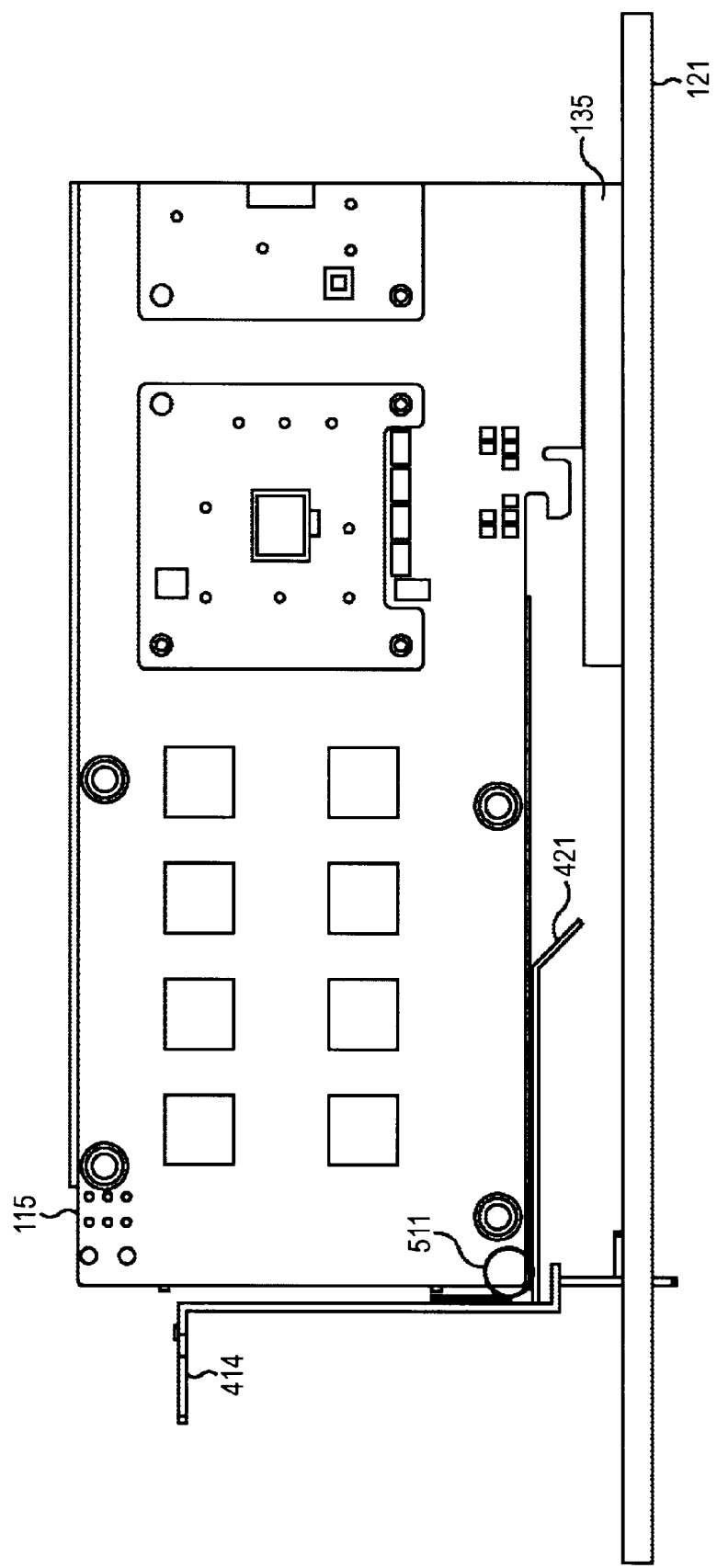
FIG. 17 is a view for explaining the state of the installation of the expansion unit and is subsequent to FIG. 16.

The state of opening and closing of the cover will be described with reference to FIG. 15 to FIG. 17. FIG. 15 is a view for explaining the state of installation of an expansion unit. FIG. 16 is a view for explaining the state of installation of the expansion unit and is subsequent to FIG. 15. FIG. 17 is a view for explaining the state of installation of the expansion unit and is subsequent to FIG. 16.

As shown in FIG. 15, the expansion unit 115 installed in the information processing apparatus 100 is pushed to a main board 121 from above the casing at a specified position above the main board 121 as indicated by an arrow 501. At this time, the position of the front of the expansion unit 115 is adjusted to the air flow adjusting gate 414.

As shown in FIG. 14 and FIG. 15, the cover 421 is a plate-like member, and the front end thereof is bent with respect to another portion and an angle is provided. When the expansion unit 115 is depressed, the front of the expansion unit 115 hits against the front end of the cover 421.

When the expansion unit 115 is further depressed, as shown in FIG. 16, a bottom surface 115E of the expansion unit 115 presses and opens the cover 421, and the opening part of the air flow adjusting gate 414 is opened.

The expansion unit is further depressed, a terminal 221 of the expansion unit 115 is connected to a slot 135 of the main board 121, and the expansion unit 115 is put in the state where it is installed at a specified position. Then, as shown in FIG. 17, the cover 421 is much pressed and opened by the bottom surface 115E of the expansion unit 115, and the opening part 161 of the air flow adjusting gate 414 is put in a completely open state. In this state, the opening part 161 of the air flow adjusting gate 414 is put in the same state as the opening part 161 of the air flow adjusting gate 114 described with reference to FIG. 1 to FIG. 13.

Incidentally, as shown in FIG. 16 and FIG. 17, the cover 421 is provided with a torsion coil spring 511 acting in the rotation direction. The cover 421 is returned in the state of closing the opening part 161 by the force of the torsion coil spring 511 unless another force acts thereon.

Accordingly, when the expansion unit 115 is removed from the main board 121 from the state of FIG. 17, as shown in FIG. 16, the cover 421 partially closes the opening part 161, and finally completely closes the opening part 161 as shown in FIG. 15.

Incidentally, in the above, although only the cover 421 of the opening part 161 is described, the above description is similarly applied to the cover 422 to the cover 428. That is, the cover 422 to the cover 428 can also open and close the opening part 162 to the opening part 168 similarly according to the attachment and detachment of the expansion units 115.

By doing so, as shown in FIG. 14, only the opening part of the air flow adjusting gate 414 to which the expansion unit 115 is mounted is opened.

Incidentally, in the above, although the case where the cover is opened and closed in the rotation direction with respect to the opening part is described, the movable direction of the cover is arbitrary. For example, the cover may move (slide) in parallel to the opening part, or the cover may be folded or wound like a blind so that the opening part is opened.

Incidentally, in the above, the configuration described as one device (or processing part) may be divided and configured as plural devices (or processing parts). Conversely, the configuration described as plural devices (or processing parts) may be integrated and configured as one device (or processing part). Besides, a configuration other than the above may be naturally added to the configuration of each device (or each processing part). Further, when the configuration and operation as the whole system are substantially the same, part of the configuration of a device (or processing section) may be included in the configuration of another device (or another processing part). That is, the embodiment of the present invention is not limited to the foregoing embodiment, and various modifications can be made within the scope not departing from the gist of the invention.

The present application contains subject matter related to that disclosed in Japanese Priority Patent Application JP 2009-101387 filed in the Japan Patent Office on Apr. 17, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic equipment comprising:
air sending means for sending, at a front of an inside of a casing, air in a direction from a front surface of the casing to a back surface to cool a heat generating element;
an air flow control member that is disposed in the inside of the casing and behind the air sending means and controls, by a shape, an air flow generated by an air blow of the air sending means; and
an expanding member that is disposed in the inside of the casing and behind the air flow control member, includes an additional electronic circuit for an electronic circuit mounted on a main board, which are cooling targets of the air blow of the air sending means, and expands a function of the electronic circuit of the main board, wherein the expanding member has a hollow structure casing and includes the additional electronic circuit in an inside of the hollow structure casing, and
the air flow control member has an opening part to allow the air flow to pass through and a blocking part to block the air flow, and supplies most of the air flow into the inside of the hollow structure casing of the expanding member by the opening part and the blocking part, the blocking part including a vent.

2. The electronic circuit according to claim 1, wherein the air flow control member fixes the hollow structure casing of the expanding member at a specified position to cause an opening part of the hollow structure casing of the expanding member to correspond to the opening part of the air flow control member itself.

3. The electronic circuit according to claim 2, wherein a plurality of expanding members are provided, the air flow control member includes a plurality of opening parts and a plurality of blocking parts, and the respective hollow structure casings of the expanding members are fixed to specified positions different from each other to cause the opening parts of the respective hollow structure casings of the plurality of the expanding members to correspond to the opening parts of the air flow control member itself different from each other.

4. The electronic circuit according to claim 1, wherein a shape of the hollow structure casing of the expanding member is a substantially rectangular parallelepiped shape of a hollow structure, and a front surface and a back surface of the hollow structure casing are opened.

5. The electronic circuit according to claim 4, wherein a plurality of expanding members are provided, and the substantially rectangular parallelepiped casings of the expanding members are arranged side by side in a lateral direction in the casing of the electronic equipment and are installed.

6. The electronic circuit according to claim 4, wherein at least two opposite surfaces of the substantially rectangular parallelepiped casing of the expanding member are formed of boards on which the additional electronic circuit is mounted.

7. The electronic circuit according to claim 1, wherein the expanding member includes a part of or all of the additional electronic circuit at an outside of the hollow structure casing of the expanding member itself.

8. The electronic circuit according to claim 7, wherein the air flow control member further includes an opening part to positively supply a part of the air flow to the outside of the hollow structure casing of the expanding member.

9. The electronic circuit according to claim 1, wherein the air flow control member further includes a cover member to cover the opening part of the air flow control member itself.

10. The electronic circuit according to claim 9, wherein the cover member is pressed and opened by the hollow structure casing of the expanding member and is closed by a torsion coil spring.

11. An electronic equipment comprising:
an air sending unit configured to send, at a front of an inside of a casing, air in a direction from a front surface of the casing to a back surface to cool a heat generating element;
an air flow control unit that is disposed in the inside of the casing and behind the air sending unit and controls, by a shape, an air flow generated by an air blow of the air sending unit; and
an expanding unit that is disposed in the inside of the casing and behind the air flow control unit, includes an additional electronic circuit for an electronic circuit mounted on a main board, which are cooling targets of the air blow of the air sending unit, and expands a function of the electronic circuit of the main board, wherein the expanding unit has a hollow structure casing and includes the additional electronic circuit in an inside of the hollow structure casing, and
the air flow control unit has an opening part to allow the air flow to pass through and a blocking part to block the air flow, and supplies most of the air flow into the inside of the hollow structure casing of the expanding unit by the opening part and the blocking part, the blocking part including a vent.

* * * * *